United States Patent
Wright et al.

(10) Patent No.: US 7,308,703 B2
(45) Date of Patent: Dec. 11, 2007

(54) PROTECTION OF DATA ACCESSIBLE BY A MOBILE DEVICE

(75) Inventors: Michael Wright, Sandy, UT (US); Peter Boucher, Orem, UT (US); Gabe Nault, Draper, UT (US); Merrill Smith, Riverton, UT (US); Sterling K Jacobson, Saratoga Springs, UT (US); Jonathan Wood, Orem, UT (US); Robert Mims, West Valley City, UT (US)

(73) Assignee: Novell, Inc., Provo, UT (US)

( * ) Notice: Subject to any disclaimer, the term of this patent is extended or adjusted under 35 U.S.C. 154(b) by 394 days.

(21) Appl. No.: 10/377,265

(22) Filed: Feb. 28, 2003

(65) Prior Publication Data

US 2004/0123150 A1  Jun. 24, 2004

Related U.S. Application Data

(60) Provisional application No. 60/438,556, filed on Jan. 6, 2003, provisional application No. 60/434,485, filed on Dec. 18, 2002.

(51) Int. Cl.
*G06F 17/00* (2006.01)
*H04K 1/00* (2006.01)
*H04L 9/00* (2006.01)
*G06F 17/30* (2006.01)
*G06F 11/00* (2006.01)
*H04L 9/32* (2006.01)

(52) U.S. Cl. .............. 726/1; 726/29; 726/35; 726/11; 380/258

(58) Field of Classification Search ........... 726/29, 726/35, 1, 11; 380/258
See application file for complete search history.

(56) References Cited

U.S. PATENT DOCUMENTS 5,724,487 A * 3/1998 Streit .................. 706/25

(Continued)

FOREIGN PATENT DOCUMENTS

| WO | WO 02/19116 A2 | 3/2002 |
|---|---|---|
| WO | WO 02/067173 A1 | 8/2002 |

OTHER PUBLICATIONS

Blunk, L. et al. "PPP Extensible Authentication Protocol (EAP)", RFC2284, Mar. 1998. <ftp://ftp.rfc-editor.org/in-notes/rfc2284.txt>.*

(Continued)

*Primary Examiner*—Gilberto Barrón, Jr.
*Assistant Examiner*—Michael J Simitoski
(74) *Attorney, Agent, or Firm*—King & Schickli, PLLC

(57) ABSTRACT

Security tools are described that provide different security policies to be enforced based on a location associated with a network environment in which a mobile device is operating. Methods for detecting the location of the mobile device are described. Additionally, the security tools may also provide for enforcing different policies based on security features. Examples of security features include the type of connection, wired or wireless, over which data is being transferred, the operation of anti-virus software, or the type of network adapter card.

The different security policies provide enforcement mechanisms that may be tailored based upon the detected location and/or active security features associated with the mobile device. Examples of enforcement mechanisms are adaptive port blocking, file hiding and file encryption.

66 Claims, 15 Drawing Sheets

U.S. PATENT DOCUMENTS

| | | | |
|---|---|---|---|
| 5,930,810 A * | 7/1999 | Farros et al. | 715/506 |
| 5,987,611 A | 11/1999 | Freund | |
| 6,088,457 A | 7/2000 | Parkinson et al. | |
| 6,484,261 B1 | 11/2002 | Wiegel | |
| 6,577,274 B1 | 6/2003 | Bajikar | |
| 6,580,914 B1 | 6/2003 | Smith | |
| 6,609,196 B1 | 8/2003 | Dickinson, III et al. | |
| 6,681,107 B2 | 1/2004 | Jenkins et al. | |
| 6,728,885 B1 * | 4/2004 | Taylor et al. | 726/24 |
| 6,772,213 B2 | 8/2004 | Glorikian | |
| 6,778,837 B2 | 8/2004 | Bade et al. | |
| 6,873,988 B2 * | 3/2005 | Herrmann et al. | 707/10 |
| 7,069,581 B2 | 6/2006 | Fu et al. | |
| 7,093,283 B1 | 8/2006 | Chen et al. | |
| 2001/0038626 A1 | 11/2001 | Dynarski et al. | |
| 2001/0044849 A1 | 11/2001 | Ndill et al. | |
| 2002/0055817 A1 | 5/2002 | Chou | |
| 2002/0078361 A1 * | 6/2002 | Giroux et al. | 713/183 |
| 2002/0095486 A1 * | 7/2002 | Bahl | 709/223 |
| 2002/0095488 A1 | 7/2002 | Bahl | |
| 2002/0112046 A1 | 8/2002 | Kushwaha et al. | |
| 2002/0160745 A1 | 10/2002 | Wang | |
| 2002/0161905 A1 | 10/2002 | Haverinen et al. | |
| 2002/0166068 A1 | 11/2002 | Kilgore | |
| 2002/0186688 A1 | 12/2002 | Inoue et al. | |
| 2002/0191593 A1 | 12/2002 | O'Neill et al. | |
| 2003/0053475 A1 * | 3/2003 | Veeraraghavan et al. | 370/431 |
| 2003/0055962 A1 | 3/2003 | Freund et al. | |
| 2003/0065942 A1 | 4/2003 | Lineman et al. | |
| 2003/0070067 A1 | 4/2003 | Saito | |
| 2003/0081821 A1 | 5/2003 | Godfrey et al. | |
| 2003/0084323 A1 | 5/2003 | Gales | |
| 2003/0112178 A1 | 6/2003 | Bajikar | |
| 2003/0135749 A1 | 7/2003 | Gales et al. | |
| 2003/0159060 A1 | 8/2003 | Gales et al. | |
| 2003/0167405 A1 * | 9/2003 | Freund et al. | 713/201 |
| 2003/0177389 A1 * | 9/2003 | Albert et al. | 713/201 |
| 2003/0184474 A1 | 10/2003 | Bajikar | |
| 2003/0194500 A1 | 10/2003 | Masuda et al. | |
| 2004/0003289 A1 * | 1/2004 | Bhogal et al. | 713/201 |
| 2004/0010579 A1 * | 1/2004 | Freese | 709/223 |
| 2004/0018844 A1 * | 1/2004 | Cheng | 455/456.1 |
| 2004/0052232 A1 | 3/2004 | Ramaswamy et al. | |
| 2004/0192339 A1 | 9/2004 | Wilson et al. | |
| 2004/0203718 A1 | 10/2004 | Knauerhase et al. | |
| 2004/0203902 A1 | 10/2004 | Wilson et al. | |
| 2004/0203903 A1 | 10/2004 | Wilson et al. | |
| 2004/0215956 A1 | 10/2004 | Vankatachary et al. | |

OTHER PUBLICATIONS

Moore, B. et al., Policy Core Information Model—Version 1 Specification, The Internet Society, 2001, pp. 1-101.

Lopez de Ipina, Diego and Lo, Sai-Lai, LocALE: a Location-Aware Lifescycle Environment for Ubiquitous Computing, *Proceedings of the 15th IEEE International Conference on Information Networking (ICOIN-15)*, Beppu City, Japan. Jan. 31-Feb. 2, 2001, [online], [retrieved on Dec. 4, 2003]. Retrieved form the Internet <URL: http://www-Ice.eng.cam.ac.uk/publications/files/tr.2001.9.pdf.

Aboba, Bernard, IEEE 802.1X Pre-Authentication, Jun. 17, 2002, Microsoft Corporation, Jun. 2002, pp. 1-47.

Location/context—Sensitive Application Development Platform Revealed for 802.11 WLANs, Sep. 7, 2001, [online], [retrieved on Jun. 5, 2003]. Retrieved from the Internet <URL: http//www.80211-planet.com.news/print.php/880761>.

Ark, Wendy S., et al., A Look at Human Interaction With Pervasive Computers, IBM System Journal, vol. 38, No. 4, 1999, pp. 504-507.

Balakrishnan, Hari, Pervasive Location-Aware Computing, MIT Laboratory for Computer Science, Presentation for "Talk on the Cricket system and future challenges in location-aware computing" on Nov. 29, 2001 (Distinguished Lecture Series, Dept. of Computer Science, Univ. of Virginia).

Barton, John J., A Cooltown Demonstration at Mobicom 2000, Internet and Mobile Systems Labs, Hewlett Packard Laboratory, [online], [retrieved on May 29, 2003]. Retrieved from the Internet <URL: http//www.hpl.

Chakraborty, Anit, A Distributed Architecture for Mobile, Location-Dependent Applications, MIT, May 16, 2000, pp. 1-58.

Dye, Anid K., Building Context-Aware Applications, Aug. 13, 2002, [online], [retrieved on Feb. 5, 2003] Retrieved from the Internet <URL: www.inf.ethz.ch/vs/events/dag2002/program/lectures/dey_1.pdf.

Grimm, Robert, et al., Future Directions: System Support for Pervasive Applications, *Proceedings of the International Workshop on Future Directions in Distributed Computing*, pp. 56-59, Bertinoro, Italy, Jun. 2002.

Grimm, Robert, et al., Systems Directions for Pervasive Computing, *Proceedings of the 8th IEEE Workshop on Hot Topics in Operating Systems (HotOS-VIII)*, pp. 147-151, Elmau, Germany, May 2001.

Harter, Andy, et al., The Anatomy of a Context-Aware Application, 1999, Retrieved from the Internet <URL: http://citeseer.nj.nec.com/cache/papers/cs/10242/ftp:zSzzSzftp.uk.research.att.comzSzpubzSzdocszSzattzSztr.1999.7.pdf/harter99anatomy.pdf.

It Knows You're Out There, Feb. 11, 2002, [online], [retrieved on Jun. 5, 2003]. Retrieved from the Internet <URL: http//www.80211-planet/com/news/print.php/972541>.

Michalakis, Nikolaos, PAC: Location Aware Access Control for Pervasive Computing Environments, MIT Laboratory of Computer Science, Cambridge, MA, USA. Jun. 25, 2002, [online], retrieved on Feb. 5, 2003.

Miu, Allen Ka Lun, Design and Implementation of an Indoor Mobile Navigation System, MIT, Jan. 2002, pp. 1-60.

Network Location Awareness Service Provider (NLA), Microsoft Corporation [online], [retrieved on Aug. 12, 2003]. Retrieved from the Internet <URL: http//www.msdn.Microsoft.com/library/en-us/winsock/network_location_awareness_servi>.

Newbury Networks Powers Royal Sonesta Hotel's Modern Art Exhibit for Wireless Location-Enabled Guided Tours; Newbury Networks, Inc., [online], [retrieved on Jun. 5, 2003]. Retrieved from the Internet <URL: http://www.newburynetworks.com/newsroom/press/press.php?id=9>.

Newbury Networks Debuts First Location-Enabled Networks Solutions for 802-11B WLANS; Newbury Networks, Inc., [online], [retrieved on Jun. 5, 2003]. Retrieved from the Internet <URL: http//www.newburynetworks.com/newsroom/press/press.php?id=8>.

Newbury Networks Introduces First Breakthrough Solution for Building Location and Context-Aware Applications for 802.11b Networks; Sep. 6, 2001; Newbury Networks, Inc., [online], [retrieved on Jun. 5, 2003]. Retrieved from the Internet <URL: http//www.newburynetworks.com/newsroom/press/press.php?id=7>.

Priyantha, Nissanka, et al., The Cricket Location-Supported System, 2000, 6th ACM International Conference on Mobile Computing and Networking (ACM MOBILCOM), pp. 32-43, Boston, MA, USA.

Priyantha, Nissanka B., et al., The Cricket Compass for Context-Aware Mobile Applications, 7th ACM Conference Mobile Computing and Networking (MOBICOM), Jul. 2001, pp. 1-14, Rome, Italy.

Priyantha, Nissanka B., et al., The Cricket Compass for Context-Aware Mobile Applications, Power Point Presentation, 7th ACM Conference Mobile Computing and Networking (MOBICOM), Jul. 2001, pp. 1-14, Rome, Italy.

Radar Scope, Mobile Internet Times, vol. 4, Issue 10, Oct. 2001, Pinestream Communications, Weston, MA, USA.

Ward, Any, et al., A New Location Technique for the Active Office, *IEEE Personal Communications*, vol. 4, No. 5, Oct. 1997, pp. 42-47, [online], [retrieved on Dec. 4, 2003]. Retrieved from the Internet <URL: http://www-ice.eng.cam.ac.uk/publications/files/tr.97.10.ps.Z.

Ziola, Brad, Label Based Access Control vs. Fine-Grained Access Control for Implementing a Virtual Private Database, Managed Ventures, LLC. Mar. 2002, pp. 1-6.

Notification of Transmittal of International Search Report, PCT/US03/40546, Aug. 23, 2004, 10 pages.

Stallings, W., "Network Security Essentials. Applications and Standards," 2000, Prentice-Hall, pp. 203-223.

* cited by examiner

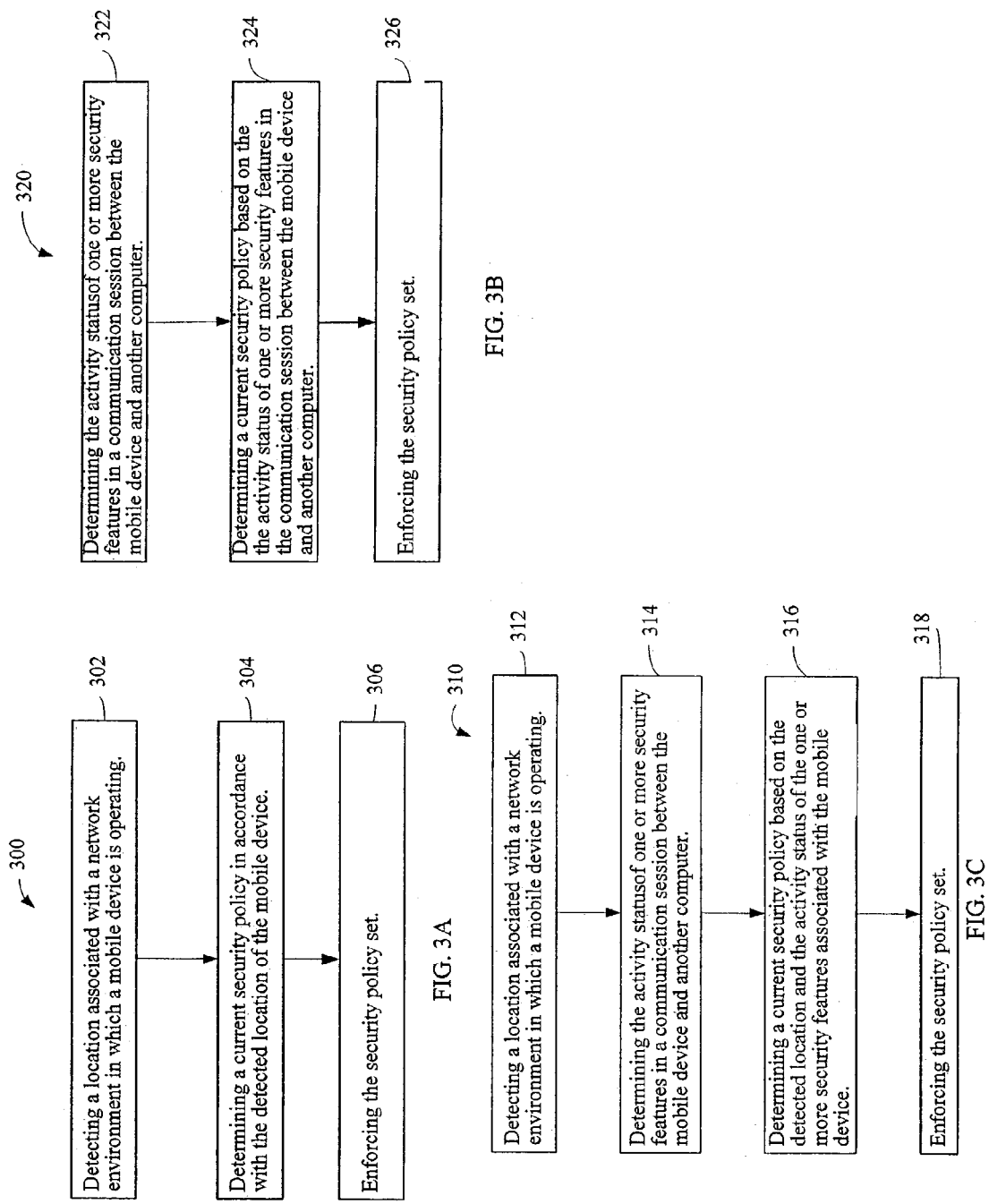

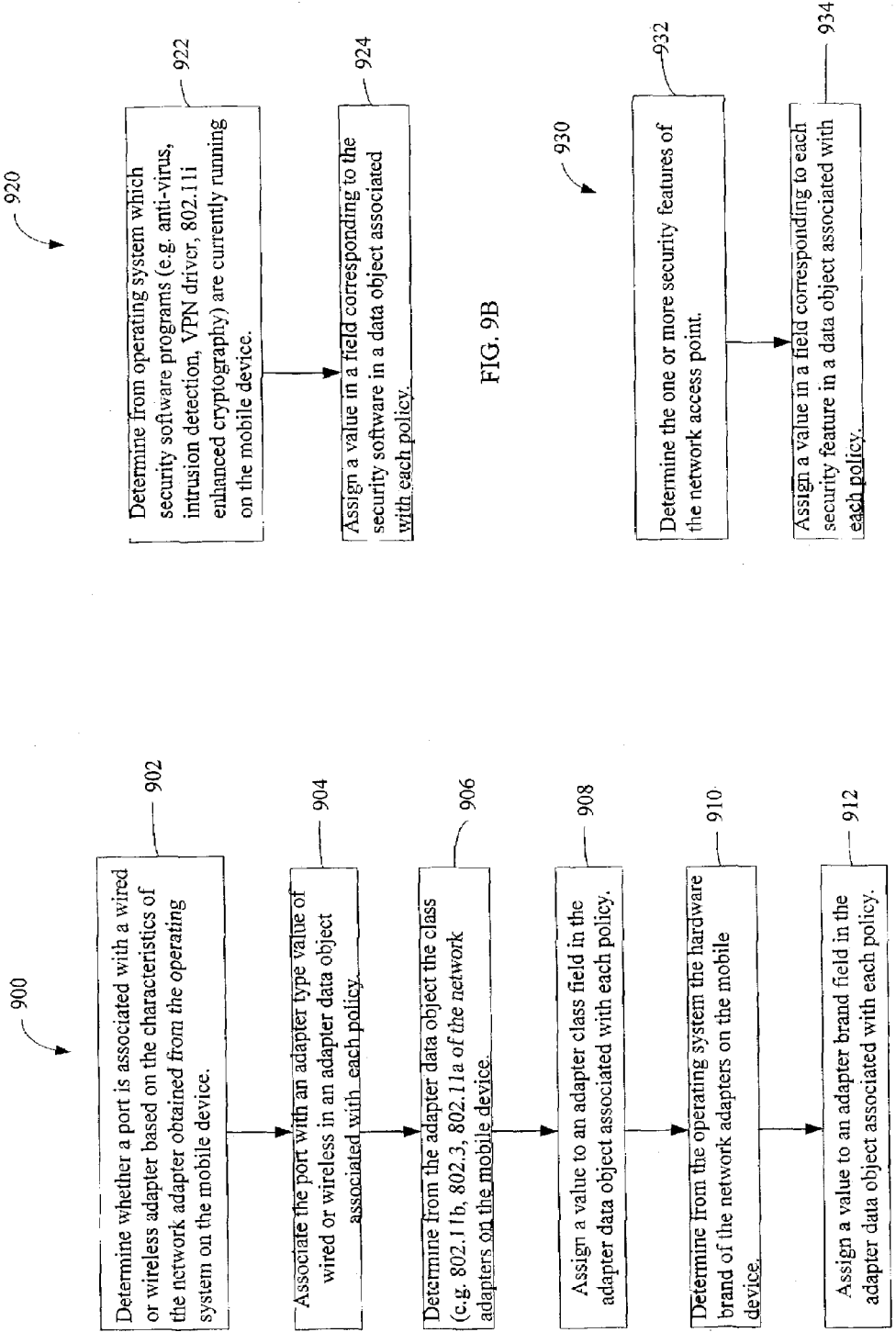

PROTECTION OF DATA ACCESSIBLE BY A MOBILE DEVICE

CROSS-REFERENCE TO RELATED APPLICATIONS

This application claims the benefit of priority under 35 U.S.C. § 119(e) to U.S. provisional patent application No. 60/434,485, filed on Dec. 18, 2002, entitled "System And Method For Protecting Data Based On Location Of Mobile Devices" having inventors Michael Wright, Peter Boucher, Gabe Nault, Merrill Smith, Sterling Jacobsen, and Jonathan Wood.

This application also claims the benefit of priority under 35 U.S.C. § 119(e) to U.S. provisional patent application No. 60/438,556, filed on Jan. 6, 2003, entitled "Remote Management For Protecting And Accessing Data Based On A Connection Type Or An Environment Of A Mobile Device" having inventors Michael Wright, Peter Boucher, Gabe Nault, Merrill Smith, Sterling Jacobsen, Jonathan Wood and Robert Mims.

BACKGROUND

Field of Invention

This application relates to the field of security of data accessible by mobile devices. Mobile devices are using wired and wireless technologies to access networks at work, at home, or in public 'hot spots'. Those same mobile devices have documents, spreadsheets, e-mail, and other files with valuable company information if not valuable personal information in them.

The availability of wired and wireless network access points (NAP) allow mobile devices like laptop computers and personal digital assistants (PDAs) to enable users today to be more mobile, providing access to corporate networks, e-mail, home networks and the Internet from anywhere. With the advent of 802.11, and other popular wireless technologies, software products that protect against unwanted access to information stored on mobile devices and corporate servers is highly desirable.

Traditional security architectures assume that the information assets being protected are 'tethered'—wired to a particular network infrastructure such as a company's network infrastructure. But mobile users can pick up valuable corporate information, such as that stored on their laptops, and walk away from the corporate network, and connect to other networks with different security policies. Users with laptops and mobile devices want to take advantage of wireless technologies, such as 802.11, to connect wherever they are—at work, at home, in the conference room of another company, at the airport, a hotel, or at the coffee shop on the corner. The mobile device's network environment is constantly changing as the user moves about. Each environment has different needs in terms of security. Each environment presents different challenges to protect the information on the mobile device while allowing access to e-mail, the Internet, and company Virtual Private Networks (VPNs). It is desirable to provide technology that automatically senses the network environment of the mobile device, associates the network environment with a location, and adjusts its security configuration and settings accordingly. It is also highly desirable to take security features in a particular network environment into account. For example, setting a security policy based on whether the data is being received over a wireless network adapter or over a wired one is highly desirable. This would allow unprecedented ease of use allowing users to move between different environments without needing to manually change security parameters, adjust difficult-to-configure firewalls, uninstall and reinstall network file sharing features, or worry about remembering what security protocols are currently set.

Simple to use, mobile-aware security tools providing different levels of security protection for different locations and/or security features are highly desirable.

SUMMARY OF INVENTION

The present invention provides one or more embodiments of a system for providing protection of data accessible by a mobile device based on a location associated with a network environment and/or security features associated with the mobile device. Furthermore, the present invention provides one or more embodiments of a method for providing protection of data accessible by a mobile device based on a location associated with a network environment and/or security features associated with the mobile device. The one or more embodiments of the present invention may also be embodied as instructions stored in a computer usable medium some examples of which are a memory, a disk, a compact disc, a field programmable gate array or an integrated circuit.

As discussed above, the present invention provides for the protection of data accessible by a mobile device. Mobile devices include portable computing devices that access a network or another computer. Mobile devices include devices that access a network or another computer through a wired connection as well as portable computing devices that access a network or another computer through a wireless connection. For example, a notebook computer accessing a network through a T1 line or phone line at an airport is a mobile device. The same notebook computer may also access a network through a wireless connection to a network access point (NAP). A portable computing device having a wireless connection capability is often referred to in this connection context as a wireless device which is a type of mobile device.

A system in accordance with an embodiment of the present invention comprises a location detection module for detecting a location associated with a network environment in which the mobile device is operating, and a policy setting module having a communication interface with the location detection module for communication of the detected location. The policy setting module determines a current security policy based upon the detected location. A security policy determines accessibility of data for the mobile device. For example, based on the current location associated with a mobile device, a file resident on the device may be encrypted or may be hidden. This system embodiment further comprises a policy enforcement control module having a communication interface with the policy setting module for communication of the current security policy to be enforced, the enforcement control module comprising one or more enforcement mechanism modules for enforcing the current security policy.

In another version, this system embodiment further comprises a security features module for determining whether one or more security features have an activity status of inactive or active in a communication session between the mobile device and another computer. The policy setting module has a communication interface with the security features module for communication of the activity status of the one or more security features. The policy setting module determines the current security policy based upon the activity status of the one or more security features as well as the detected location in this version.

Another system in accordance with an embodiment of the present invention comprises a security features module for determining whether one or more security features have an activity status of inactive or active in a communication session between the mobile device and another computer. This system embodiment further comprises a policy setting module having a communication interface with the security features module for communication of the activity status of the one or more security features, the policy setting module determining the current security policy based upon the activity status of the one or more security features. This embodiment further comprises a policy enforcement control module having a communication interface with the policy setting module for communication of the current security policy to be enforced, the enforcement control module comprising one or more enforcement mechanism modules for enforcing the current security policy.

A computer-implemented method for providing protection of data accessible by a mobile device in accordance with an embodiment of the present invention comprises the following: detecting a location associated with a network environment in which the mobile device is operating, determining a current security policy based upon the detected location, the security policy determining accessibility of data for the mobile device, and enforcing the current security policy.

A computer-implemented method for providing protection of data accessible by a mobile device in accordance with another embodiment of the present invention comprises the following: determining whether one or more security features have an activity status of inactive or active in a communication session between the mobile device and another computer, and determining the current security policy based upon the activity status of the one or more security features as well as the detected location.

A computer-implemented method for providing protection of data accessible by a mobile device in accordance with another embodiment of the present invention comprises the following: determining whether one or more security features have an activity status of inactive or active in a communication session between the mobile device and another computer, determining a current security policy based upon the activity status of the one or more security features, and enforcing the current security policy.

BRIEF DESCRIPTION OF THE DRAWINGS

FIG. 3A illustrates a method for protecting data accessible by a mobile device based on a location associated with a network environment in which the mobile device is operating in accordance with an embodiment of the present invention.

FIG. 3B illustrates a method for protecting data accessible by a mobile device based on a security feature in accordance with another embodiment of the present invention.

FIG. 3C illustrates a method for protecting data accessible by a mobile device based on a location associated with a network environment in which the mobile device is operating and a security feature in accordance with another embodiment of the present invention.

FIG. 9A illustrates an example of a method for determining whether the security feature of a connection type of wireless or wired is in effect for a communication session between the mobile device and another computer in accordance with an embodiment of the present invention.

FIG. 9B illustrates an example of a method for determining whether the security feature of a security software program is currently executing on a mobile device for a communication session between the mobile device and another computer in accordance with an embodiment of the present invention.

FIG. 9C illustrates an example of a method for determining one or more security features of a network access point with which the mobile device is communicating in accordance with an embodiment of the present invention.

DETAILED DESCRIPTION

Figure 1:
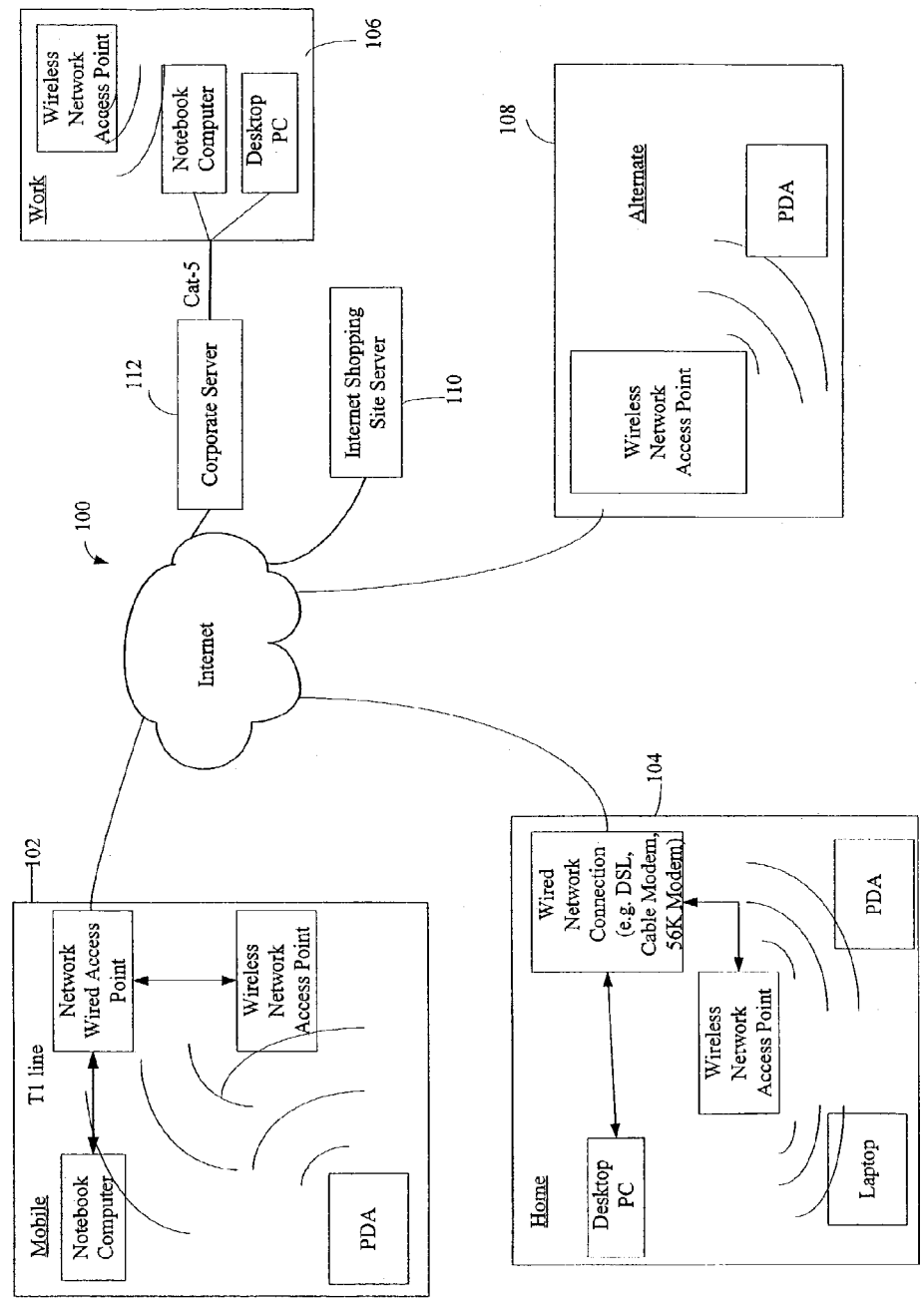
FIG. 1 illustrates one or more examples of location categories which may be assigned to a mobile device in accordance with an embodiment of the present invention.

FIG. 1 illustrates one or more examples of location categories which may be assigned based on the network environment in which a mobile device is operating in accordance with an embodiment of the present invention. One example of a location category is "Home" 104. The network environment in which each of the mobile devices communicates via a network connection at a user's home is detected. Upon detection of this home network environment, each of the mobile devices are assigned a location indicator or type of "Home" 104. In the illustrated example, each of the laptop and the PDA communicating with the illustrated wireless network access point will have its location set to "Home."

The location "Work" 106 is an example of a location associated with a network environment maintained by a user's employer. In the illustrated example, a notebook computer has a wired CAT-5 Ethernet connection to the corporate server of his or her employer. However, the notebook computer may also communicate with the server through a wireless NAP as illustrated.

One example of a location category is "Mobile" 102. For example, at an airport, a mobile device such as the illustrated notebook computer accesses a network environment respectively through a wired connection to a wired network access point. This wired network access point may provide access to an Internet shopping site server 110 because the user desires to browse the site while waiting for departure. The notebook computer and the personal digital assistant (PDA) have a wireless connection to a wireless NAP through which they may communicate at the airport. Additionally, as discussed below, the security policy associated with the "Mobile" location may take into account the connection type of wired or wireless. In this example, the network environment provided at the airport does not match with a defined environment associated with a location such as "Work" or "Home" so "Mobile" is assigned or associated with the PDA and the notebook computer as a default location.

The last location example is "Alternate" 108. In one example, a specific environment (e.g. an environment associated with a university computer lab) may be associated with "Alternate." Similarly, a "Custom" location may also be defined.

Figure 2:
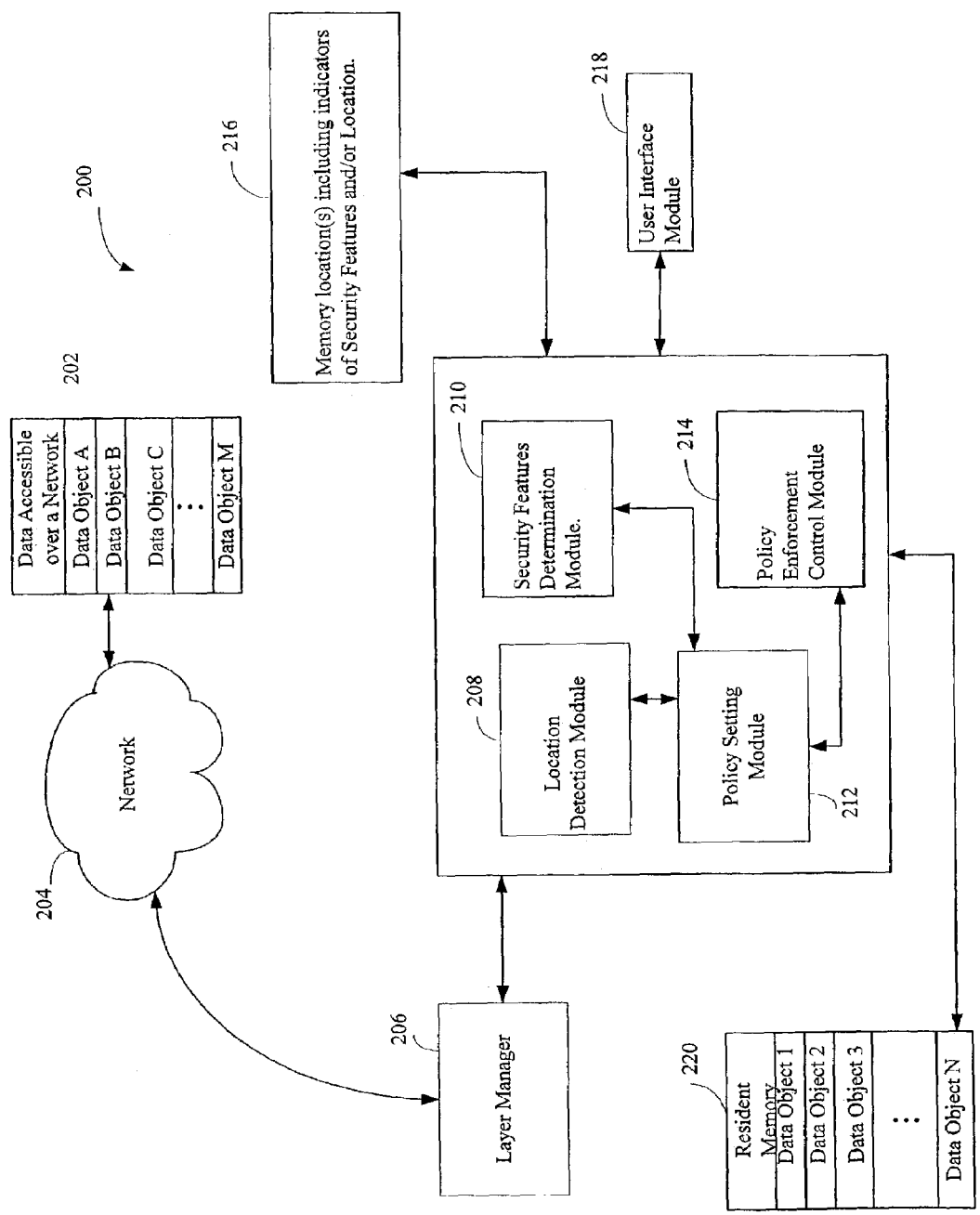
FIG. 2 illustrates a system for protecting data accessible by a mobile device based on either or both of a location associated with the mobile device or a security feature in accordance with an embodiment of the present invention.

FIG. 2 illustrates a system 200 for protecting data accessible by a mobile device based on a location associated with a network environment in which the mobile device is operating in accordance with an embodiment of the present invention. Additionally, the system embodiment 200 in FIG. 2 illustrates a system for determining and enforcing security policies based upon the activity status of a security feature in a communication session between the mobile device and another computer. The illustrated system embodiment comprises a location detection module 208, a policy setting module 212, security features determination module 210, a policy enforcement control module 214, a layer manager 206, a user interface module 218, and memory location(s) 216. The system embodiment protects data accessible by the mobile device that may be in resident memory 220 on the device or be data 202 accessible over a network 204.

A layer manager 206 processes network traffic which may include inbound data 202 accessible over a network and outbound copies of data objects from resident memory 220. In this embodiment, the layer manager 206 processes information in one or more layers of a model for communications between computers in a network. An example of such a model is the Open Systems Interconnection (OSI) data communications model. The seven layers of the OSI model are the physical layer, the data-link layer, the network layer, the transport layer, the session layer, the presentation layer, and the application layer. Another example is the layered Internet Protocol stack. It is represented as four layers including the subnetwork layer, the Internet layer, the transport layer, and the application layer.

The layer manager 206 has a communication interface to one or more modules 208, 210, 212, 214. A module comprises instructions for performing a task. In this embodiment, the layer manager 206 has a communication interface, for example a software interface, to a location detection module 208. The location detection module 208 detects or determines the location associated with the current network environment based upon pre-defined criteria. In this example, the policy setting module 212 comprises instructions for establishing this pre-defined criteria based upon user input. In this embodiment, memory locations 216, including indicators of security features and/or location indicators, have a communication interface (e.g. a bus between a processor executing one or more of the modules and a memory controller responsible for memory reads/writes) to the location detection module 208, the security features determination module 210, the policy setting module 212, and a policy enforcement control module 214. The location detection module 208 has a communication interface to the policy setting module 212. In the embodiment, the policy setting module 212 determines a security policy based upon the location detected by the location detection module 208 and communicated via a communication interface. In one example of the communication interface, the policy setting module 212 may read a current location indicator 216 updated in a memory location 216 by the location detection module 208. The policy setting module 212 may then read the location indicator 216 periodically or responsive to a notification message from the location detection module 208. In another example, the location detection module may pass the currently detected location to the policy setting module as a parameter in a message. Of course, other communication interfaces known to those of ordinary skill in the art for use in notifying the policy setting module of the current location may also be used.

The policy setting module 212 also has a communication interface to a policy enforcement module 214. The policy enforcement module 214 comprises instructions for enforcing the security policy currently set by the policy setting module 212. The enforcement module 214 comprises instructions for one or more enforcement mechanisms (see discussion) associated with a security policy. In this embodiment, a user interface module 218 has a communication interface to one or more of these modules 208, 210, 212, 214. In one embodiment, the user interface module 218 receives input from a user input device such as a keyboard, mouse, or touchpad, and causes user interfaces to be displayed for use by a user for establishing criteria for defining an aspect of a security policy. Examples of aspects include location definitions, defining or identifying security features to be monitored, ports to be monitored, network services to be monitored, applications to be monitored, or enforcement mechanisms to be put in place for a particular policy.

The illustrated system 200 embodiment in accordance with the present invention further comprises a security feature module 210 for determining whether one or more security features have an activity status of inactive or active in a communication session between the mobile device and another computer. An example of a security feature is a connection type of wired or wireless as may be indicated by the association of the port over which data is communicated with a wireless or wired network adapter or network interface card (NIC). In other embodiments, policies may be set based on particular features besides simply connection type. For example, a different security policy may be applied for different brands of NICs or particular classes (802.3, 802.11a or 802.11b) of NICs. Furthermnore, different security policies may be assigned based on the operating system employed or the version of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or antivirus software, or intrusion-detection software may be the basis for setting different policies on a particular port, network adapter or for data that is being transferred in a session over a VPN or processed by security software such as antivirus or intrusion-detection.

The policy setting module 212 comprises instructions for establishing the features to be monitored. As with the location detection module 208, the security features module 210 has a communication interface to the policy setting module 212 in this embodiment as well as the memory locations 216. In one example, the activity status of active or inactive for a security feature may be indicated by an activity status indicator field for the feature stored in the memory locations 216. The policy setting module 212 may be notified of the active features via the communication interface implemented in the same manner described in any one of the examples discussed above with respect to the location detection module 208 or in any manner known to those of ordinary skill in the art.

The policy setting module 212 communicates the current security policy to the policy enforcement control module 214 via a communication interface implemented in the same manner described in any one of the examples discussed above with respect to the location detection module 208 or in any manner known to those of ordinary skill in the art. The policy enforcement module 214 comprises one or more enforcement mechanism modules as specified by the policy. For example, in a communication session between the mobile device and another computer in which data is being transferred over a wireless connection, based on this connection type, in one example, the enforcement module 214 may prevent certain files from being transferred over the wireless connection as opposed to the cases in which the data is being transferred over a wired connection, or the case in which 802.11 i cryptography is being used over the wireless connection.

In the embodiment of FIG. 2, any one of the modules (e.g. 206, 208, 210, 212, 214, 218) may have an event logging module and/or an auditing module. In one example, each of the event logging module or the auditing module may record events pertinent to its respective module (e.g. location detection module 208). In another example, either or both of the event logging module or the auditing module may process events and perform audits relating to the processing performed by more than one of the modules.

For illustrative purposes only, the method embodiments illustrated in FIGS. 3A, 3B and 3C are discussed in the context of the system embodiment of FIG. 2.

FIG. 3A illustrates a method 300 for protecting data accessible by a mobile device based on a location associated with the mobile device in accordance with an embodiment of the present invention. In the system embodiment of FIG. 2, the location detection module 208 detects 302 a location associated with a network environment in which a mobile device is operating. The policy setting module 212 determines 304 what security policy is to be the currently enforced or current security policy based upon the detected location associated with the mobile device. The policy enforcement module 214 enforces 306 the current security policy.

FIG. 3B illustrates a method 320 for protecting data accessible by a mobile device based on a security feature in accordance with another embodiment of the present invention. In the system embodiment of FIG. 2, the security features module 210 determines 322 whether one or more security features have an activity status of active or inactive in a communication session between the mobile device and another computer. The policy setting module 212 determines 324 the current security policy based upon the activity status of the one or more security features. The policy enforcement module 214 enforces 326 the current security policy that has been set by the policy setting module 212.

FIG. 3C illustrates a method 310 for protecting data accessible by a mobile device based on a location associated with the mobile device and a security feature in accordance with another embodiment of the present invention. In the system embodiment of FIG. 2, the location detection module 208 detects 312 a location associated with a network environment in which a mobile device is operating. Furthermore, in the system embodiment of FIG. 2, the security features module 210 determines 314 whether one or more security features have an activity status of active or inactive in a communication session between the mobile device and another computer. The policy setting module 212 determines 316 the current security policy based upon the detected location and the activity status of the one or more security features associated with the mobile device. The policy enforcement module 214 enforces 318 the current security policy that has been set by the policy setting module 212.

A system embodiment such as that in FIG. 2 may execute one or more of the method embodiments shown in FIGS. 3A, 3B or 3C on a continuous basis such as may be implemented for example using a periodic time setting or a loop. As a user moves through different network environments associated with different locations, the location detection module 208 continues detecting or monitoring the location using one or more location detection methods. Similarly the security module 210 continuously monitors the activity status with respect to one or more security features. With each change in location or security feature or both, the policy setting module 212 determines whether a change in the current security policy is necessary. The policy enforcement module 214 is notified of the change and enforces the new security policy set as the current policy. A notification of a change in policy, location, security feature or a combination of any of these may be sent by the policy setting module 212 or policy enforcement module 214 to the user interface module 218 which may then cause a notification indicating the change to be displayed in order to provide the user an opportunity to intervene in the policy change if he desires or is allowed to do so. Whether a notification is displayed or not, the security policy change in this embodiment is performed automatically without requiring user intervention.

Figure 4B:
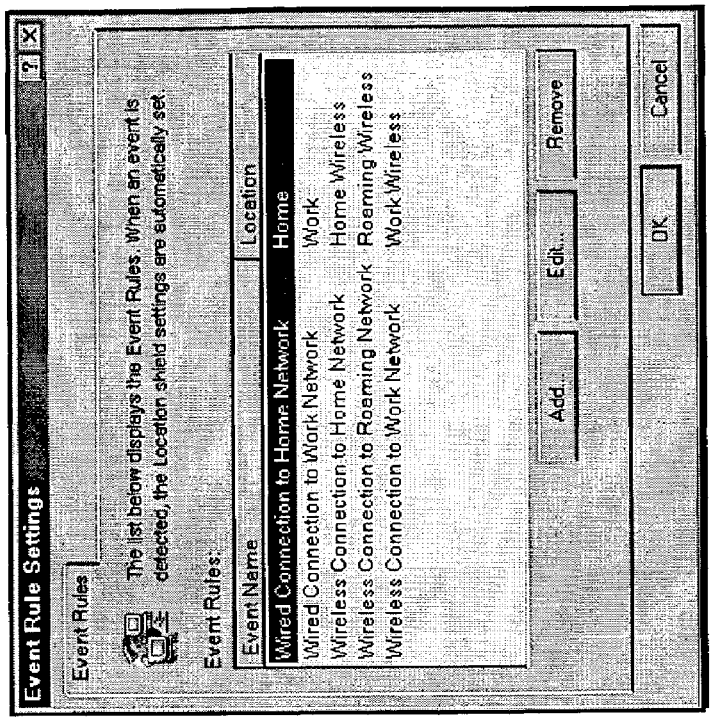
FIG. 4B illustrates an example of a graphical user interface displaying examples of combinations of a location and a security feature, each combination forming the basis of selecting a security policy in accordance with an embodiment of the present invention.
Figure 4A:
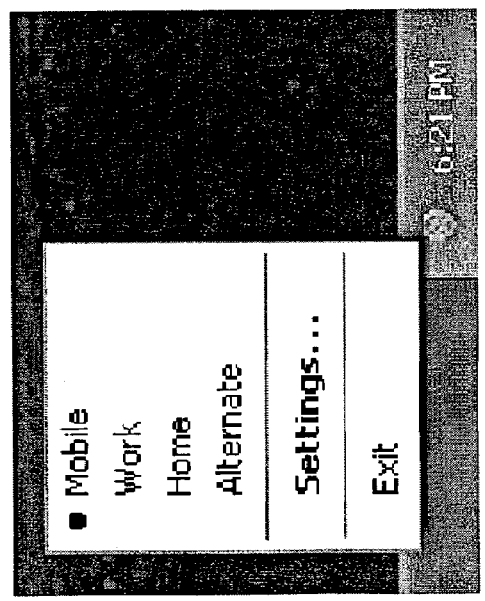
FIG. 4A illustrates an example of a graphical user interface displaying examples of locations in accordance with an embodiment of the present invention.

FIG. 4A illustrates an example of a graphical user interface displaying examples of locations in accordance with an embodiment of the present invention. The examples illustrated correspond to those shown in FIG. 1, "Mobile" 102, "Home" 104, "Work" 106 and "Alternate" 108.

FIG. 4B illustrates an example of a graphical user interface displaying examples of combinations of a location and a security feature, each combination forming the basis of selecting a security policy in accordance with an embodiment of the present invention. In this example, a location and a connection type detected are matched with an indicator. This indicator serves the dual role of a location indicator and a security feature indicator. As illustrated, the combination of having a "Wired connection to Home Network" results in an indicator or category of "Home." A "Wireless Connection to Home Network" results in an indicator or category of "Home Wireless" signifying that the associated policy accounts for security risks associated with a wireless connection.

Security policies may be stored as data objects accessible over a network 202 or in resident memory 220. A security policy may have associated with it or be associated with more than one location or security feature. For example, a security policy may be defined as a container having an object type of "location" and a data object type of "security feature." In one example, the "location" data object has attributes of "security features" and rules defining the policy associated with the location type. One example in which the security feature of adapter type is included in the location data type definition is illustrated below ---
Policy
Locations
Location (list)
Adapters
Wired Adapter
Wireless Adapter
Permissions
Rules
File Encryption
. . .

---

In the illustrated example, network adapters are generalized into the two categories of wired and wireless and when the policy is put into action on the mobile device, whatever adapters exist on the mobile device inherit the properties of these two prototype adapters in the policy object.

Figure 5B:
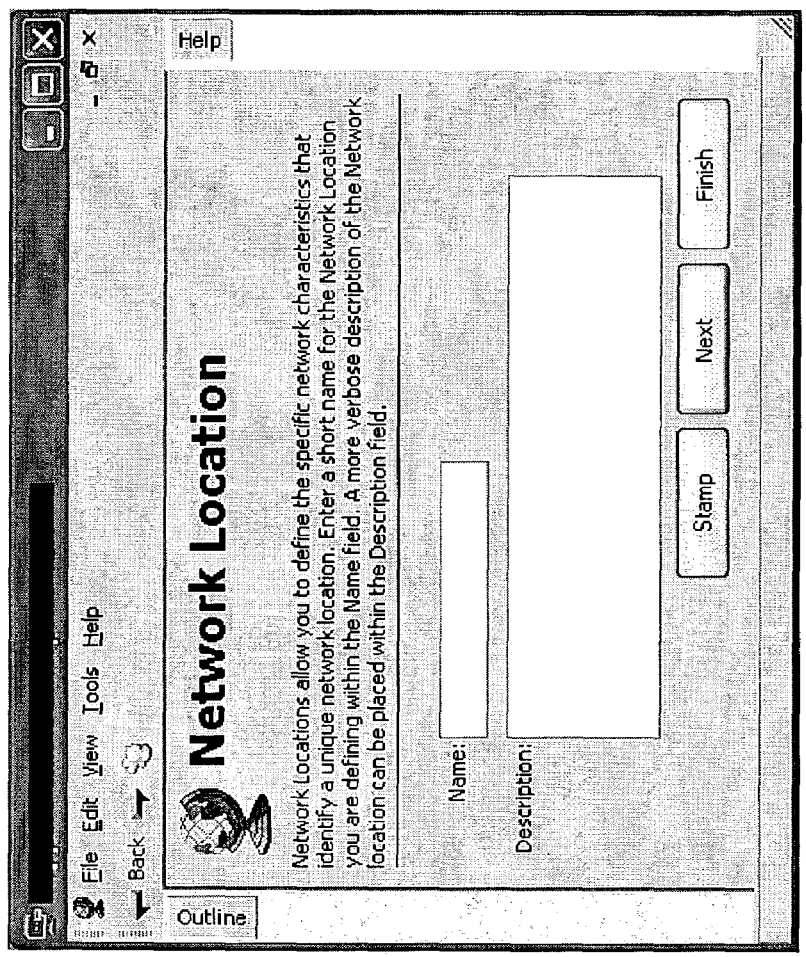
FIG. 5B illustrates a graphical user interface example illustrating a method for defining criteria with respect to environmental network parameters or characteristics to define a location in accordance with an embodiment of the present invention.
Figure 5A:
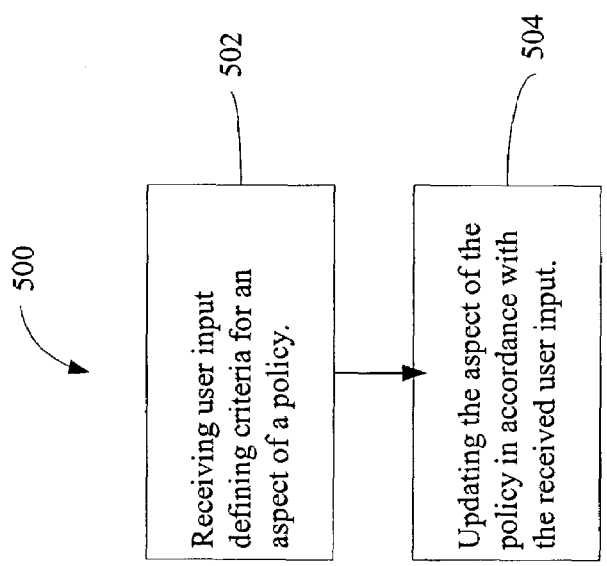
FIG. 5A illustrates a method for defining criteria for an aspect of a security policy in accordance with an embodiment of the present invention.

FIG. 5A illustrates a method 500 for defining criteria for an aspect of a security policy in accordance with an embodiment of the present invention. An example of an aspect of a policy is a location or a security feature. Another example is a component to be monitored such as a port or port group or a file. For illustrative purposes only, the method embodiment is discussed in the context of the system of FIG. 2. The policy setting module 212 receives 502 user input from the user interface module 218 defining criteria for an aspect of a policy, and the policy setting module 212 updates 504 the aspect of the policy in accordance with the received user input. FIGS. 5B, 5C, 5D and 5E illustrate graphical user interfaces illustrating an example of how an aspect of a policy may be defined.

FIG. 5B illustrates a graphical user interface example illustrating a method for defining criteria with respect to environmental network parameters or characteristics to define a location in accordance with an embodiment of the present invention. In the embodiment of FIG. 2, the policy setting module 212 may receive from the user interface module 218 a user-selected name for a location to be defined via such a graphical user interface as this illustrated example. A user-provided description may also be received for this location via the illustrated interface. Responsive to a selection of a button indicating the user wants the location to be defined, a "Stamp" button in this embodiment, one or more network parameters are determined. In the example in the context of FIG. 2, responsive to the "Stamp" request, the policy setting module 212 requests a snapshot of the current network environment parameters which it receives in the example of FIG. 2 from the layer manager 206. Examples of network parameters are identifications of network services such as Gateways, Domain Name System (DNS) Servers, (Dynamic Host Control Protocol) DHCP and Domain servers. Other examples include identifications for Windows® Internet Naming Service (WINS) servers. These one or more network parameters are stored in a look-up table (e.g. in a data object in resident memory 220 or in memory locations. 216) that associates these parameters with a location.

Figure 5D:
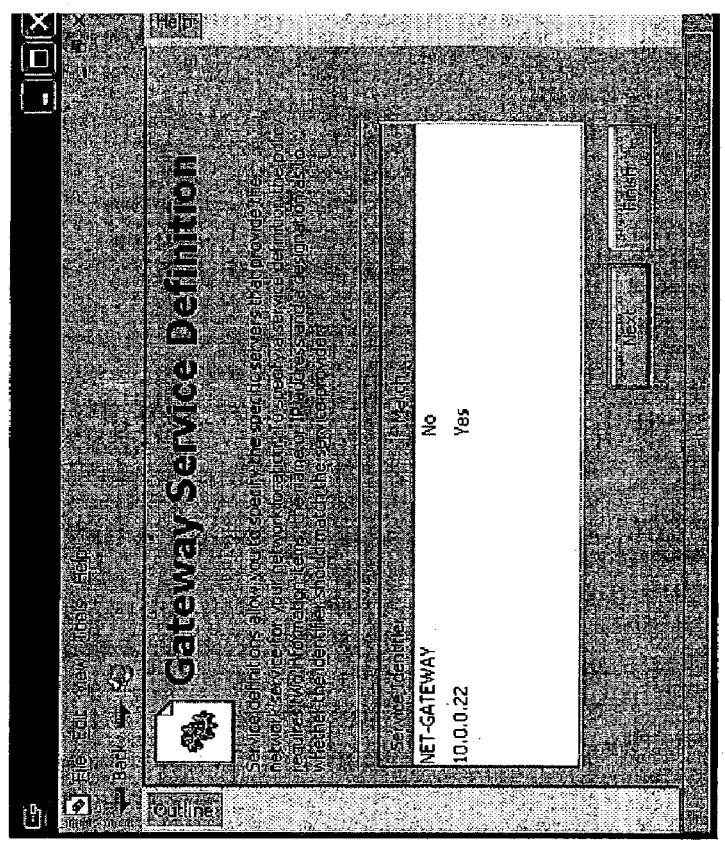
FIG. 5D illustrates a graphical user interface example for configuring parameters associated with one of the selected network services, in this example Gateway services, of the method example described in FIGS. 5B, 5C, 5E and 5F in accordance with an embodiment of the present invention providing for further configuration of the selection of services.
Figure 5C:
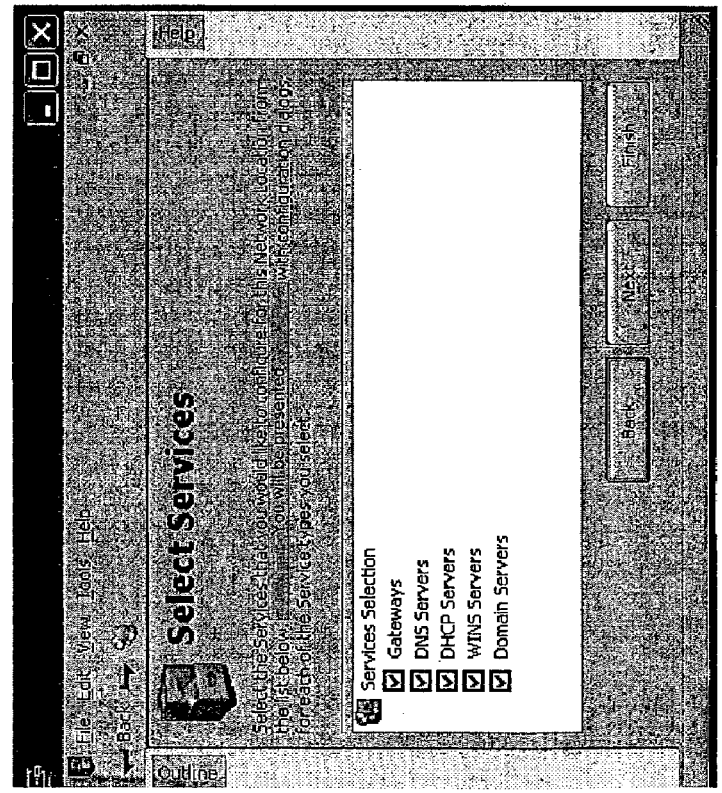
FIG. 5C illustrates a graphical user interface example displaying the network services identified in a network snapshot in further illustration of the method example described in FIGS. 5B, 5D, 5E and 5F.

FIG. 5C illustrates a graphical user interface example displaying the network services identified in a network snapshot in further illustration of the method example described in FIGS. 5B, 5D, 5E and 5F. In the example in the context of FIG. 2, the policy setting module 212 directs the user interface module 218 to display the types of servers identified in the network snapshot which the user interface module 218 causes to be displayed in such an interface as the illustrated example of FIG. 5C. The displayed user interface example of FIG. 5C illustrates by check marks user input that has been received via an input device identifying those services selected for further configuration.

FIG. 5D illustrates a graphical user interface example for configuring parameters associated with one of the selected network services, in this example Gateway services, of the method example described in FIGS. 5B, 5C, 5E and 5F in accordance with an embodiment of the present invention providing for further configuration of the selection of services. FIG. 5D presents an example user interface for configuring a "Gateway Service Definition." In this embodiment, the service definition specifies the specific servers that provide network service for this location. In this example, for each service provider entry, a service definition may be defined by a service identifier having a value of a NETBIOS name such as "NET-GATEWAY" or an IP address. In the example in the context of FIG. 2, a service identifier designation is received by the policy setting module 212 from the user interface module 218. In the illustrated example of FIG. 5D, the service identifier designation indicates whether or not a particular service identifier provided by a service provider during location detection in operation of the mobile device must match this service identifier by a "Yes" or a "No" input designation. The policy setting module 212 stores the service identifiers and their corresponding service identifier designations so that they are associated with the location being defined.

Figure 5E:
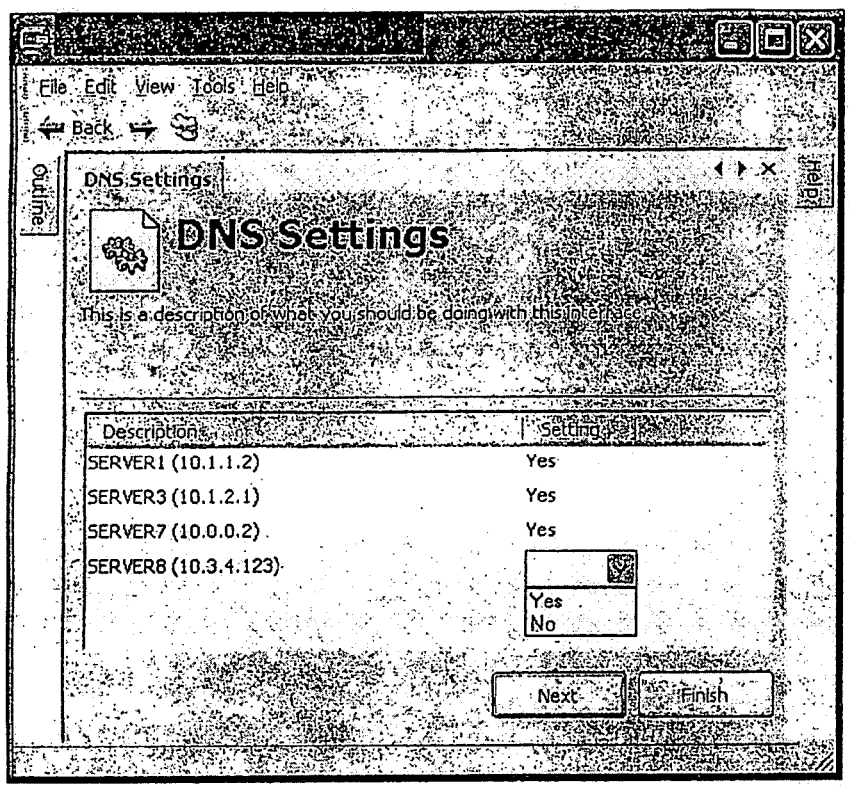
FIG. 5E illustrates another graphical user interface example for configuring parameters associated with one of the selected network services, in this example Domain Name System (DNS) Servers, of the method described in FIGS. 5B, 5C, 5D and 5F in accordance with an embodiment of the present invention providing for further configuration of the selection of services.

FIG. 5E illustrates another graphical user interface example for configuring parameters associated with one of the selected network services, in this example Domain Name System (DNS) Servers, of the method described in FIGS. 5B, 5C, 5D and 5F in accordance with an embodiment of the present invention providing for further configuration of the selection of services. In this example, the parameter associated with each of these identified servers is an IP address, and user input designates by "Yes" or "No" whether the IP Address is a parameter to be associated with the location associated with this network environment.

Figure 5F:
FIG. 5F illustrates an example user interface for indicating a minimum number of network services or service providers to be present within the network environment for a valid location identification in continuing illustration of the example of a method in accordance with the present invention illustrated in FIGS. 5B, 5C, 5D, and 5E.

FIG. 5F illustrates an example user interface for indicating a minimum number of network services or service providers to be present within the network environment for a valid location identification in continuing illustration of the example of a method in accordance with the present invention illustrated in FIGS. 5B, 5C, 5D, and 5E. In the example in the context of FIG. 2, the minimum number is received by the user interface module 218 and forwarded to the policy setting module 212. This minimum number may include the number of service providers whose service identifiers must match plus a number of service providers whose identifiers may optionally match according to a user defined criteria.

Figure 6A:
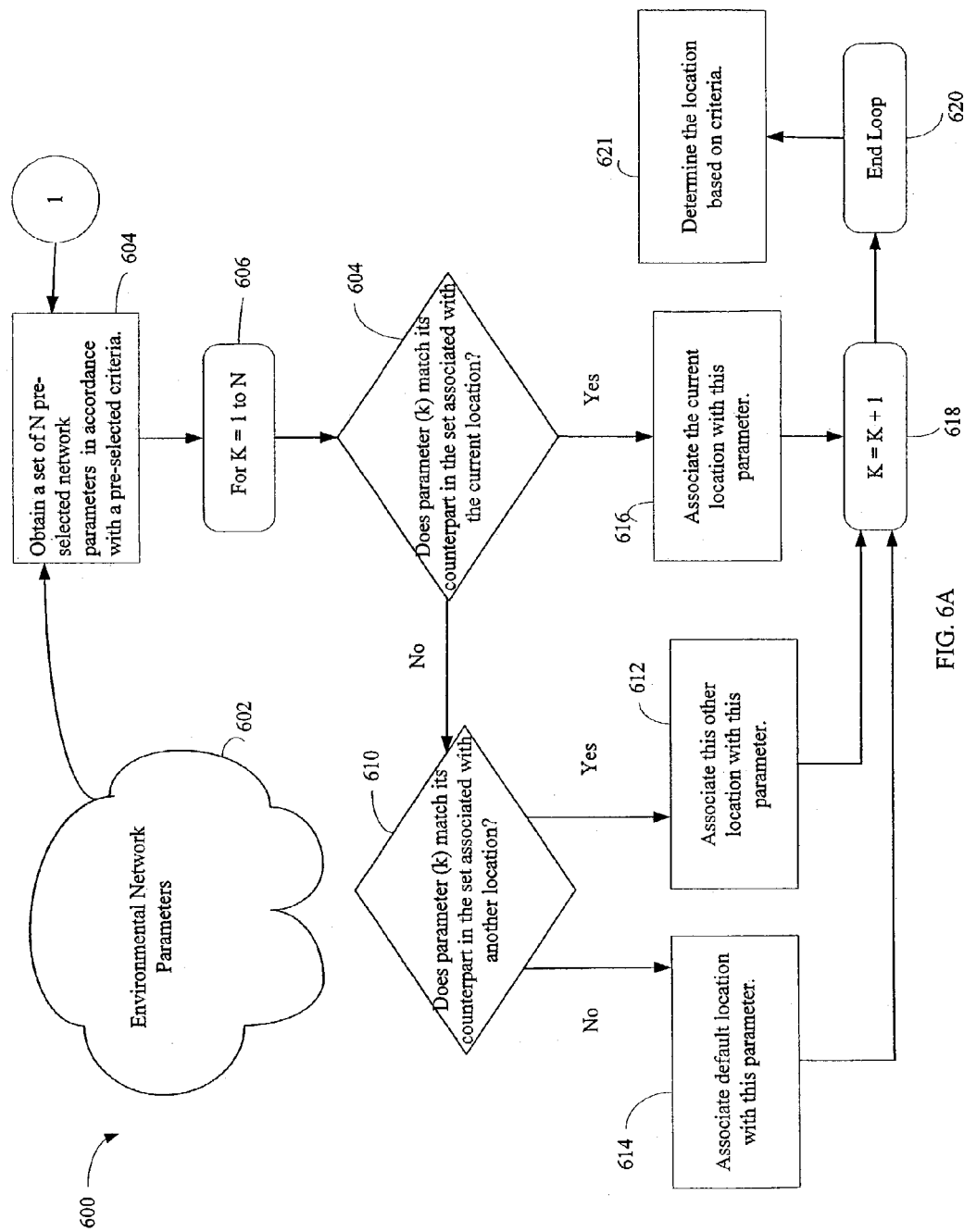
FIG. 6A illustrates a method for detecting location based upon a defined criteria in accordance with an embodiment of the present invention.

FIG. 6A illustrates a method 600 for detecting location based upon a defined criteria in accordance with an embodiment of the present invention. The defined criteria may be based on network parameters such as the examples of a Domain, Gateway, DHCP, DNS1, DNS2, DNS3, and WINS servers as discussed with reference to FIGS. 5B-5F. Additionally, the criteria may include one network parameter or a combination of network parameters available within the same layer of a communication model or across layers of a communication model. Examples of such parameters include a MAC address associated with the data-link layer of the OSI model or the subnetwork layer of the Internet Protocol Stack (IPS), an IP address typically associated with the network layer of the OSI model and the Internet layer of the IPS model, a port value typically associated with the transport layer in the OSI or IPS models, and an application parameter (e.g. an application identifier or information derived by an application) typically associated with the application layer in the OSI or IPS models.

Figure 6B:
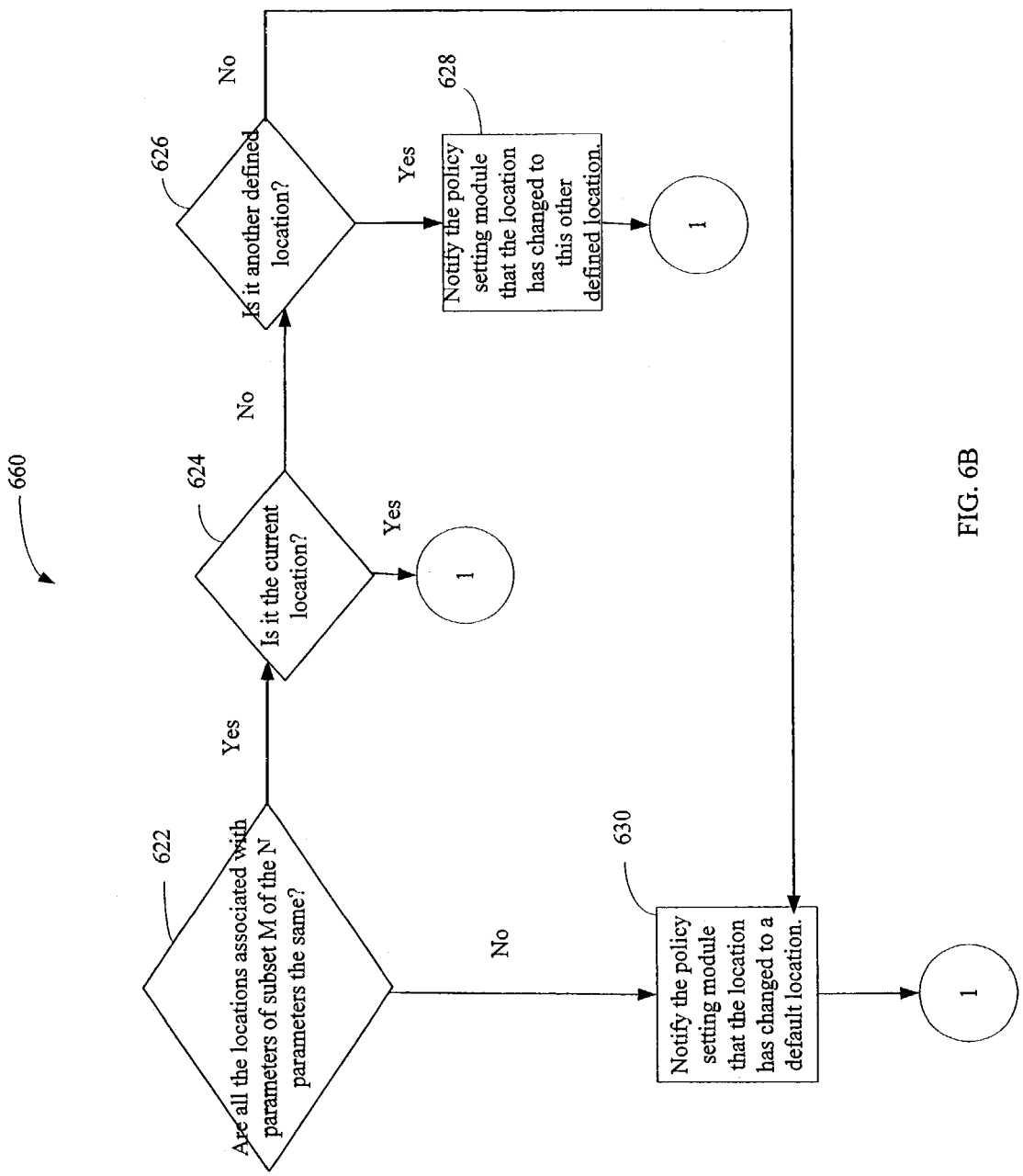
FIG. 6B illustrates one version of the method in accordance with this embodiment of the present invention illustrated in FIG. 6A in which the criteria is a matching criteria.
Figure 6C:
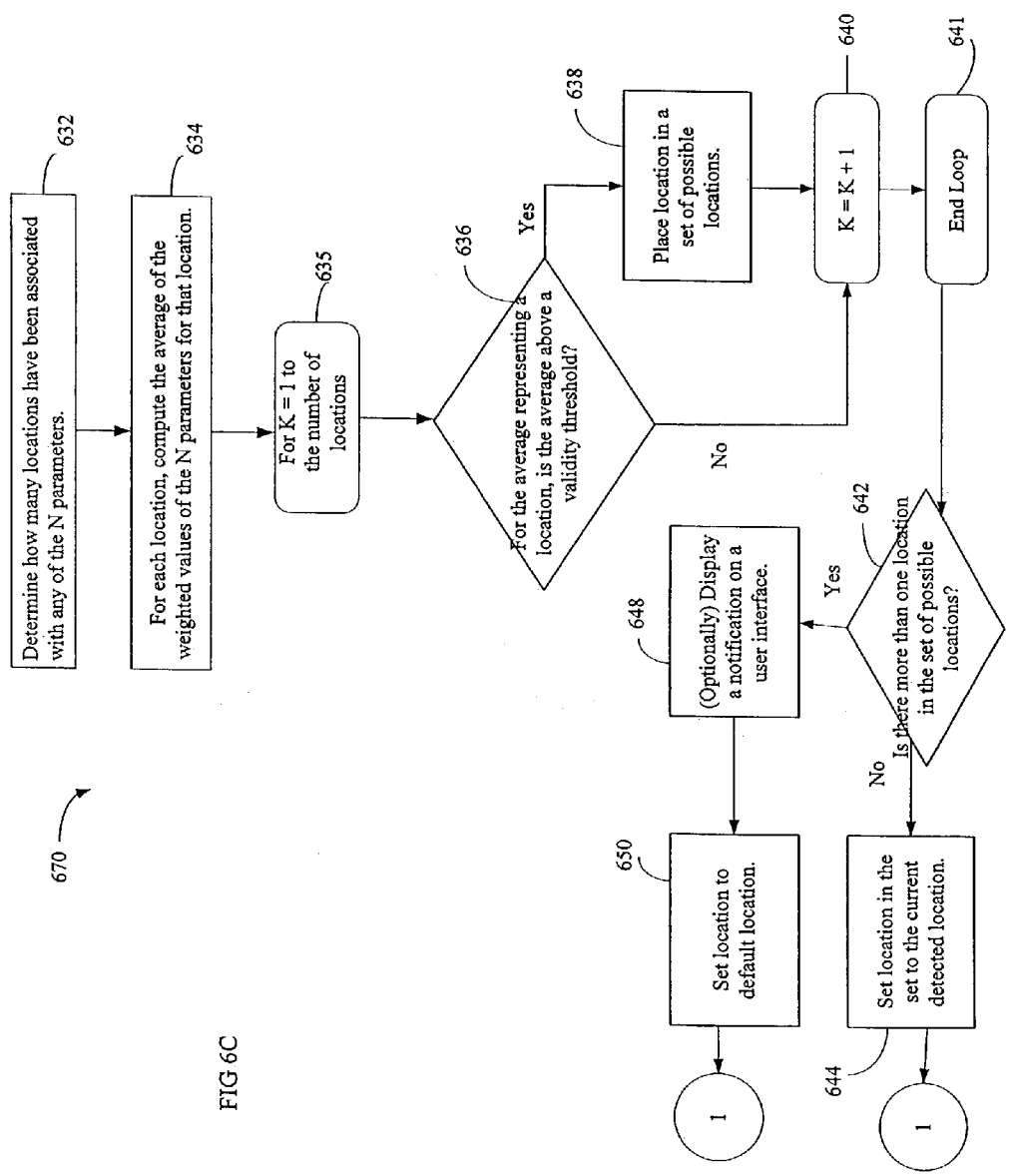
FIG. 6C illustrates one version of the method in accordance with this embodiment of the present invention illustrated in FIG. 6A in which the criteria is a weighted average of N network parameters.

For illustrative purposes only, the method embodiments illustrated in FIGS. 6A, 6B and 6C are discussed in the context of the system embodiment of FIG. 2. The layer manager 206 obtains 604 a set of N pre-selected network parameters from the network environment 602 to which the mobile device is connected and forwards them to the location detection module 208. The location detection module 208 processes 606 each of the M parameters received. Such processing may be done in a loop 606, 620. For each parameter, it is determined 608 whether it matches its counterpart in the set associated with the current location. If yes, the location detection module 208 associates 616 the current location with this parameter. For example the association may be accomplished using a lookup table. The next parameter is selected 618 for review (e.g. K=K+1). If the parameter value does not match the predefined value for the current location, it is determined 610 if it matches the predefined value for another location. If so, associate 612 this other location with this parameter (e.g. in a lookup table). Otherwise, associate 614 a default or location with this parameter in a lookup table. After the N parameters have been processed, the location is determined 621 based on criteria.

FIG. 6B illustrates one version 660 of the method in accordance with this embodiment of the present invention illustrated in FIG. 6A in which the criteria is a matching criteria. It is determined 622 whether all the locations associated with a subset M of the N parameters are the same. If they are, it is determined 624 whether this location is the current location. If it is, then the next set of N parameters is processed (See 604 in FIG. 6A). The following example illustrates a subset M of N parameters that may be used to identify a network.

| (Minimum of 3 matches) | | |
|---|---|---|
| Domain: | AcmeBananas | (Must Match, #1) |
| Gateway: | 10.0.0.254 | (Should Match, #1) |
| DHCP: | 10.0.0.12 | |
| DNS1: | 10.0.123.1 | (One of the DNS's Must Match, #2) |
| DNS2: | 10.0.123.2 | |
| DNS3: | 10.0.132.1 | |
| WINS: | 10.0.0.212 | (Should Match, #2) |

Suppose N=7, and M=3 in order to define this location as "work" for the mobile device of an Acme Bananas employee. The Domain of "AcmeBananas" may be defined as a parameter that is required to match. Additionally, the second required match for the subset M may be that any one of, but at least one of, the three DNS servers' IP addresses must match its counterpart in the defined criteria for this "work" location. For the third required match in this example of M=3, the match may be selected from a set parameters. In the example above, if either of the Gateway IP address or the WINS server IP address matches, the three required matches have been found satisfying the defined criteria for the "work" location.

An event logging module may be helpful in tracking which parameters match successfully on a consistent basis. In the above example, the user may view the event log and see that there has never been a match for DNS3 since the "work" location was defined. This may indicate to the user that a check of the IP address for DNS3 may be order to verify it was entered correctly. If it is not the current location, it is determined 626 if it is another defined location. If so, then the policy setting module is notified 628 that the location has changed to this other defined location, and the next set of N parameters is processed 604.

In different examples, M may have different numbers. For example, it may be one. Perhaps for a home wireless network, the MAC address for a network access point is the only parameter tested to identify the home network environment. All other locations may be assigned a Mobile location designation. M may be the minimum number described with respect to FIG. 5F representing a number of network environment parameters to be examined.

Similarly, a location detection test may detect location based on parameters from different layers in a model for communications between computers in a network. For example, the N parameters in the illustrated Acme Bananas example may also define a MAC address, a layer 2 data-link parameter, a TCP port, a layer 4 transport parameter and a layer 7 application parameter including information derived by the application in the criteria for a location. The two additional terms below illustrate an example.

DNS1: 00-01-03-32-72-AB
POP3: 10.0.0.35:99

Assume for this example, that Acme Bananas operates its POP3 mail service on port 99, a layer 4 parameter, instead of a standard port 110. In this example, the MAC address: 00-01-03-32-72-AB for DNS1 is a layer 2 parameter. Each of these parameters may be required to match or may be a discretionary parameter, such as the Gateway IP address or WINS server IP address in the example above, whose match may be used in a location detection test. For this illustrative example, we refer to the system of FIG. 2 again for purposes of illustration and not limitation. The location detection module 208 may have an application proxy that emulates a POP3 client in order to verify that the POP3 service is actually running on the specified server on port 99 in this example (which is not the standard POP3 port of port 110). This information is a layer 7 or application layer parameter upon which a location detection decision may be based. As seen in this example, different layers can provide additional verification of parameters received at other layers. Here the layer 7 parameter is verifying the layer 4 parameter.

If it was determined 622 that all the locations associated with the M parameters were not the same, the policy setting module is notified 630 that a default location is the current location, and the next set of N parameters is processed 604.

FIG. 6C illustrates another version 670 of the method embodiment in FIG. 6A in which the criteria 621 for determining location is a weighted average of N network parameters. It is determined 632 how many locations have been associated with any of the current set of N parameters. For each location, the average of the weighted values is computed 634 for the N parameters for that location. It is determined 636 for each of the averages associated with a location, if the average is above a valid threshold. If it is, then the location is stored 638 in a set of possible locations. The processing would repeat 640 if there are more than one location associated with any of the N parameters. It is determined 642 whether there is more than one location in the set of possible locations. If not, then the location in the set is set 644 to the current detected location. Responsive to the determination that there are more than one locations in the possible set, optionally, a notification may be displayed 648 on a user interface. The location is set 650 to a default location.

In a variation of the method embodiment of FIG. 6C, instead of an average, each of the N parameters may be assigned a confidence or weighted value. Parameters of more significance receive higher confidence values. An average or a sum of the confidence values may be computed to determine location. Consider the example of Acme Bananas again. Assume percentages or percentiles are assigned to each of the seven parameters in accordance with a user-defined location definition for "work." Assume the domain name has a confidence value of 0.4, each of the DNS servers has a value of 0.4, and the WINS server has a confidence value of 0.25. Assuming a threshold of one as a sum of the confidence values is the threshold criteria for associating this network environment with the location "work," if the domain name, at least one of the DNS servers' IP addresses, and the WINS IP address match their predetermined counterparts, the sum of their confidence values exceeds one. "Work" is associated with the mobile device operating in this network environment.

Those of skill in the art will recognize that in another version, the method embodiments illustrated in FIGS. 6A, 6B, and 6C may also be applied in defining criteria for activation state of security features which define or trigger the setting of a particular security policy. Also, in another version, the method embodiment of FIGS. 6A, 6B, and 6C may be used to define criteria for setting a policy based on a combination of network parameters for a location and active security features. Another method of location detection involves a cryptographic authentication protocol (CAP) between the mobile device and a server for which a successful exchange identifies the client as being in a known environment. For example, in FIG. 1, one of the mobile devices depicted may exchange a key with the Internet shopping site 110. A custom location of "shopping" may be associated with the mobile device and the policy associated with the "shopping" location may be enforced when communicating with the servers under the control of this Internet shopping site. In another example, a cryptographic authentication protocol (e.g. occurring when a network connection is initiated) may be one of several network characteristics to be verified to establish the location of "work" 106. Types of cryptographic authentication protocol protocols that may be used are those employing private keys, public keys or both (i.e., asymmetric or symmetrical authentication protocols may be used." Similarly, other cryptographic authentication protocols include Secure Sockets Layer (SSL) certificates. For example, the location detection module 208 verifies that the internet shopping site is the proper or authentic site using the public key. In another example the location detection module 208 determines whether the mobile device is operating in the "work" location network environment. The location detection module 208 sends a random challenge such as a number encrypted using the corporate server's (e.g. 112) public key. The corporate server decrypts the random challenge using its private key. The server performs a hash function (e.g. SHA1) of the random challenge result from its decryption and a random nonce such as a number. The server forwards the hash result and the random nonce back to the location detection module 208. The location detection module 208 performs a hash of the random challenge it originally sent and the random nonce received from the server. It then compares this second hash result with the one received from the server. A match indicates that this is the corporate server 112 of the user's employer, the location detection module 208 associates "work" with the mobile device.

In another embodiment, detection of a location may be based upon identifying one or more Network Access Points (NAP) with which a mobile device is associated or whose range it has roamed within based on the known presence of the one or more NAPs. The presence of the NAPs may be stored in a look-up table accessible by the mobile device. The MAC address of the NAP may be exchanged in an association or authentication protocol between the mobile device and the NAP.

Consider the example, in a workplace of a complex of buildings, that there may be several wireless NAPs. One of the parameters for determining a "work" location (e.g. 106) may be a MAC address which must match one of these wireless NAPs. Furthermore, the MAC address in this example may be used to define sub-locations within the work environment. For example, a particular NAP may be in the software lab while another is in a conference room. The policy for the "software lab" environment allows a mobile device accessing a corporate server to access certain files while a mobile device trying to access the files via the conference room NAP receives a notification that these files cannot be found. In another version of this last scenario, the policy associated with the conference room sub-location may allow the files to be accessed in the conference room if a virtual private network (VPN), as indicated by a port, a layer 2 tunneling parameter, a layer 3 tunneling parameter or an application parameter, is used to access these certain files copied from certain network drives. In addition to or instead of the MAC address, the IP address of each wireless NAP may be used as a basis for location detection as well.

Similarly, a Service Set Identifier (SSID) may also be used alone or in combination, for example with the MAC address and IP address of a NAP in its segment, as a basis for location detection as well. Based upon the SSID, the location detection module 208 determines the name of the NAP being used. There can be a policy that defines a set of SSIDs that can be used at a particular location by a given mobile device.

Figure 7:
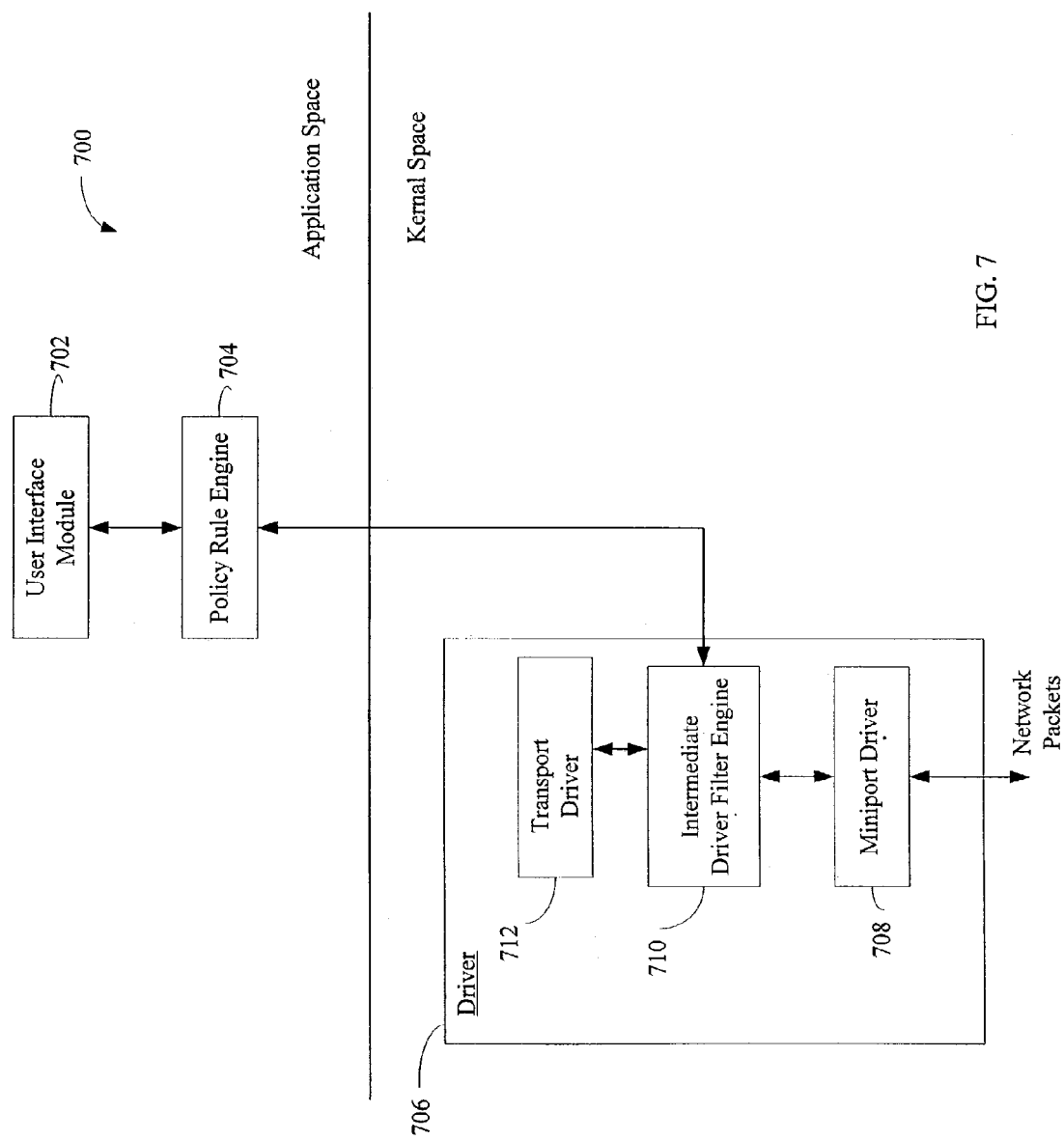
FIG. 7 illustrates a system for protecting data accessible by a mobile device in accordance with an embodiment of the present invention.

FIG. 7 illustrates a system 700 for protecting data accessible by a mobile device in accordance with an embodiment of the present invention. The system comprises a policy rule engine 704 embodied as a software application that has a communication interface (e.g. a software interface) to a user interface module 702 and a communication interface to a filter engine 710 embodied in a driver software program 706 operating in the kernal space of an operating system. In one example, the filter engine 710 may be embodied within a Network Driver Interface Specification (NDIS) driver 706 typically used in a Windows® operating system.

In this embodiment, the filter engine acts as a layer manager in processing parameters at the network layer in the OSI or IPS models. Network packets from the network interface card (NIC) are received by a Miniport Driver 708. A Miniport Driver 708 processes packets for a particular port or range of ports. The Miniport Driver 708 has a communication interface to the filter engine 710 and forwards packets to the filter engine 710. The filter engine 710 detects one or more parameters in a packet. For example, the filter engine may detect an IP source address for the packet. Additionally, the MAC address of the network access point that routed the packet may be detected. Also, the filter engine may read the packet header for a port address or determine the port group with which the packet is associated based upon which miniport driver forwarded it. The filter engine 710 has a communication interface to a transport driver 712 software program. Information that the transport driver 712 may determine is session information associated with the transport layer in the OSI model. Session information usually defines a session by an IP address and a port address.

In this embodiment, the filter engine 710 also acts by analogy as a policy enforcement module 214 under the control of the policy rule engine 704. The policy rule engine in this embodiment is analogous to the policy setting module 212 in FIG. 2. The policy rule engine 704 has a communication interface to filter engine 710 from which it receives notification of a detected location or a detected security feature or attribute. An example of a security feature which may have been detected is that a certain port is using a wireless connection. The policy rule engine 704 selects the security policy based on either of the detected location or the detected security feature or both. The filter engine 710 is instructed by the policy rule engine 704 to execute one or more enforcement mechanisms in accordance with the current settings or policy.

For example, if the current security policy does not allow file sharing to be activated for the mobile device, but allows internet access, the filter engine 710 checks packets for port destination. If the port is associated with file sharing, the packets for that port are dropped. If the packets are for internet access, they are allowed. The policy rule engine 704 may apply different rules with respect to inbound packets than for outbound packets. For example, if the file sharing request is initiated by the client device in outbound packets, inbound packets responsive to that request as determined by an IP address, a port identifier, or an application parameter are forwarded. However, an inbound initial request for file sharing will be dropped and not processed at all.

In another example, the policy rule engine 704 directs the filter engine 710 to drop all packets associated with a port identifier, representing for example, a TCP port, a port group type such as web surfing ports, or a TCP port range, using a wireless connection. The filter engine 710 drops all packets on that port but allows access, for example internet access and e-mail, over other ports associated with a wired local area network (LAN) connection.

In other example, no communication with other computers may be allowed so that the filter engine 710 drops all packets. In yet another example, the policy allows all packets to be passed through which the filter engine 710 does.

The user interface module 702 is analogous to the user interface module 218 in FIG. 2. For example, it processes input and output to assist a user in defining a policy aspect or in viewing and responding to notifications.

Figure 8:
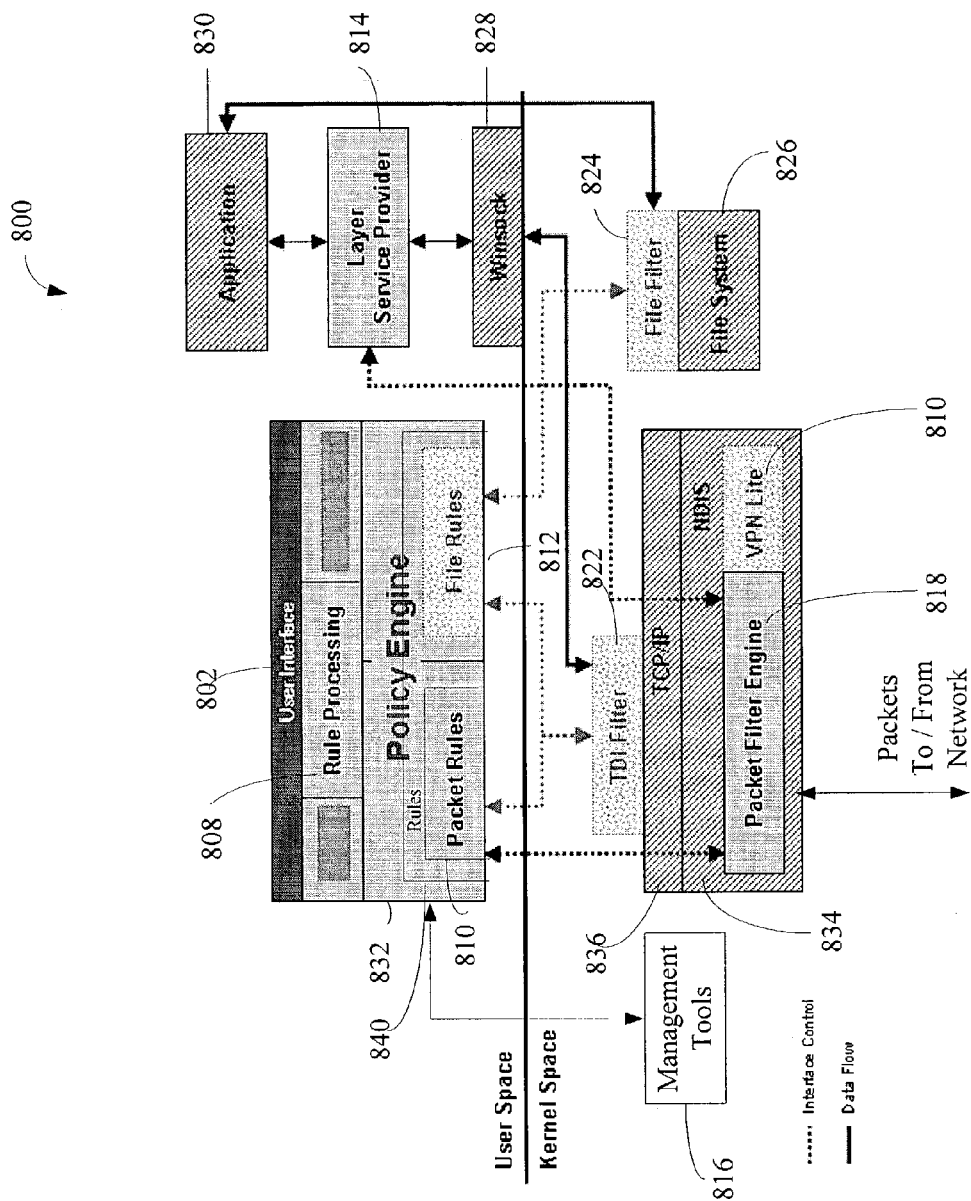
FIG. 8 illustrates a system for protecting data accessible by a mobile device in accordance with another embodiment of the present invention.

FIG. 8 illustrates a system 800 for protecting data accessible by a mobile device in accordance with another embodiment of the present invention. As with the other system embodiments, this embodiment monitors changes in the mobile device's network environment associated with different locations and applies the appropriate policies automatically. As illustrated the system embodiment comprises a policy engine 832 operating in application space having a communication interface to management tools 816 of the operating system, a communication interface to a file filter 824 operating in the kernel space that controls access to the file system 826, a communication interface to a user interface module 802, and also having a communication interface to a packet filter engine 818 operating within a driver 834, in this example an NDIS intermediate driver 834 operating within the kernel of the operating system of the mobile device, the packet filter engine 818 having a communication interface with a layer service provider (LSP) 814 operating in application space. In one example, the communication interface between the engine 832 and the packet filter engine 818 is an IOCTL interface through which commands are sent.

The policy engine 832 further comprises a rule processing module 808, Rules 840 and representative examples of rules subsets, packet rules 810 and file rules 812. In addition to the packet filter engine 818, the driver 834 further comprises an application filter 822, in this example, implemented as a transport driver interface (TDI) filter 822 and a VPN module 810 embodied here as a VPN Lite 810 implementation discussed below. The TDI filter 822 comprises a communication interface with the packet rules subset 810 and the file rules 812 subset in this example. It also communicates with the packet filter engine 818 as part of the driver 834. The TDI filter 822 further comprises a communication interface with a Windows Socket (Winsock) layer 828 in application space. The Winsock layer communicates with layer service provider 814 implemented in this example as a Windows socket filter, the layer service provider 814 having a communication interface as well with one or more applications 830 in application or user space.

In this embodiment, network environment location detection is performed by the policy engine 832, in accordance with rules implementing one or more location detection tests in the Rules set 840, based on network parameters obtained by the NDIS driver for OSI layers 2-5, and by the layered service provider for OSI layers 6 and 7. For example, the layer or layered service provider 814 (LSP) captures information about network applications starting and stopping and what ports the applications will be using. This information is provided to the filter 818 and the policy engine 832 to provide application awareness.

In this example, layer service provider 814 is a windows socket filter is used to determine which application (e.g. browser e-mail application such as Outlook Exchange®) is accessing the network and what networking services the application will be using. The layer service provider 814 will pass this information to the packet filter engine 818, which then informs the policy engine 832 using an event signaling mechanism. An example of an event signaling mechanism is to used named events to signal the policy engine 832 that some event has occurred.

Filtering of specific applications provides further resolution for location detection and enforcement mechanisms. The context of Microsoft® Networking provides an example of the benefits of such a filter. Several applications such as Exchange and Microsoft® File Sharing can and do use the same TCP and UDP ports. The NDIS filter driver 834 cannot determine which application is active based solely on TCP and UDP. The NDIS filter driver will act on the low level information i.e. TCP or UDP port numbers. When the packet arrives at the TDI layer 822, the TDI filter driver 822 determines based on one or more application parameters for which Microsoft Networking application a packet is destined and if the packet should be forwarded or filtered.

A benefit of this embodiment is that it allows the NDIS filter driver to do low level filtering based on port or protocol information and not have the overhead of application specific parsing. A modular approach to packet and application filtering is allowed.

The policy engine 832 also has a communication interface to management tools 816 of the operating system. The management tools 816 provide information to the policy engine 832 such as the types of adapters connected to the mobile device and specific information about each of them such as their brand name. The policy engine 832 also receives from the management tools 816 the ports associated with each adapter. Additionally management tools 816 alert the policy engine 832 regarding which applications are running. For example, a process table maintained by the operating system may be monitored and notifications sent by the management tools 816 to the policy engine 832. For example, it may be determined whether 802.11i wired equivalency protection (WEP) software is running on a network adapter card through which wireless data is being received. In this way, the policy engine determines which security features are available in a system.

The Policy Engine 832 creates and manages security policy as well as enforces the policy. The Policy Engine 832 receives user input and send output via a communication interface with the user interface module 802 to display and change policy settings responsive to user input.

Rules 840 comprise rules that define one or more security policies to be enforced by the Policy Engine 832. The policy engine 832 comprises a rule processing module 808 which executes tasks in accordance with determinations to be made as set by the rules for the current security policy and for directing the appropriate results dictated by the rules of the current policy.

In one embodiment, rules are pairings of logically grouped conditions with results. The following are examples of conditions, which may be connected by logical operators:
Check for the existence of a registry key
Check for a registry value
Check for the existence of a file
Check for a currently running application
Check for a currently running service
Check for the existence of network environment settings (includes a list of environments)
Verify that specified applications are running
Verify that specified protocols are enabled
Verify that specified VPN is running The following are examples of results:
Can/Can't use the network
Can/Can't use the machine
Locked in to a certain location
Can/Can't access the file
Can/Can't use the application
Only transfer encrypted version of file.

Examples of subsets of rules are illustrated in FIG. 8, packet rules 810 and file rules 812. These subsets illustrate examples of enforcement mechanisms that may work at different layers of a communication model, for example at the network layer and at the application layer.

One example of an enforcement mechanism is referred to as stateful filtering. In one example, a security policy is called a type of shield or is referred to as a particular type of shield level. The state may hereafter be referred to as the shield state or shield.

If the filtering is performed on a packet basis, it is referred to as stateful packet filtering. In stateful packet filtering, a packet filter such as the packet filter engine 818 as it name suggests filters packets based on a state set by the currently enforced policy with respect to a parameter. Examples of such a parameter include port numbers, port types or a port group. A port group is a list of ports that are used by a particular application, network service or function. For example, a port group can be created that includes all the ports for a particular instant messaging application, or for all supported instant messaging applications, or for all applications used internally at a company. Examples of port groups that may be selected for processing by a policy include web surfing ports, gaming ports, FTP and SMTP ports, file sharing and network ports, and anti-virus updates and administration ports. A port group can contain individual port items or other port groups.

In this example, we discuss a version of stateful filtering called adaptive port blocking. In this example, there are rules comprising a mapping between a set of ports, port types, and actions. The ports are the actual port numbers, the port types enumerate the possible port types e.g. UDP, TCP, IP, or Ethertype, and the actions are what is to be done with this particular port e.g. filter, forward, or inform. The inform action will post an event to the policy engine 832 when a packet is sent or received on the specified port. Filter and forward action control the sending and receiving of packets on the specified port.

In one example, a policy is in effect that each port is in one of three modes: open, closed, or stateful. When the port is open, all traffic (both incoming and outgoing) on that port is permitted to flow through the firewall. When the port is closed, all traffic on that port is blocked (both incoming and outgoing) When the port is stateful, all outgoing traffic on that port is permitted to flow through the firewall, and incoming responses to that outgoing traffic are allowed back through, but unsolicited incoming traffic is blocked. In another example, incoming and outgoing traffic may be blocked on a basis, examples of which are a network service or an application.

In the system embodiment illustrated in FIG. 8, components such as the policy engine 832, the packet filter engine 818, the layer service provider 814 and the TDI filter 822 may be employed for supporting stateful filtering. In one example, a session is created when a mobile device initiates communications with a particular remote or a specified set of remote computing devices. The stateful filtering, as may be performed by the packet filter engine 818 and /or the TDI filter 822 in accordance with rules 840, for example rules in the subset of the packet rules 810, applicable to the current policy, may use the transport protocol to determine when a session is starting and the address of the remote device. Forward and filter decisions in accordance with rules in the set of rules 840 or the subset of the packet rules 810 may be based upon the session information obtained at session startup. Additionally, forward and filter decisions may be based on application parameters received via the layer service provider 814. This provides the benefit of more refined application filtering as illustrated in the example discussed above.

The policy engine will pass the rules to the packet filter engine as commands using the existing IOCTL interface. In one example, the policy engine determines based upon its current rules which ports or range of ports should do stateful filtering. These rules are then passed to the packet filter engine 818 by an IOCTL command. In another example, the policy engine 832 determines that rules of the current security policy do not support certain applications accessing a network. These rules are passed to the packet filter engine as well as the TDI filter 822 for application specific filtering.

Stateful packet filtering deals with packets with different types of address. Outgoing packets have three different types of addresses: directed, multicast, or broadcast. Directed addresses are specific devices. Broadcast packets are typically used to obtain network configuration information whereas multicast packets are used for group applications such as NetMeeting.®

To establish session state information with a directed address is straightforward. The IP address and the port number are recorded in a session control block. When the remote responds the receive side of the filter engine will forward the packet because a session control block will exist for that particular session.

When the outgoing packet is a multicast packet there is a problem. Multicast packets are sent to a group; however, a multicast address is not used as a source address. Hence any replies to the outgoing multicast will have directed addresses in the source IP address. In this case the filter engine will examine the port to determine a response to a given multicast packet. When a response to the specified port is found session control block will be completed i.e. the source address of this incoming packet will be used as the remote address for this particular session. However, more than one remote may respond to a given multicast packet, which will require a session control block be created for that particular remote. The broadcast packets may be handled in the same manner as the multicast.

The file rules subset 812 have a communications interface such as an IOCTL interface with a file filter 824 having a communication control interface with a file system 826. The file filter 824 may implement one or more filter related enforcement mechanisms. A policy may protect files based on the location in which they are created and/or modified as well as the location in which the mobile device is operating. The policy specifies a set of locations in which the files are to be made available, and whenever the mobile device is not operating in one of those locations, those files are unavailable. In another embodiment, policies may require that files be encrypted only if they were copied from certain network drives.

One reason for requiring that all files created and/or modified in one of the specified locations is so that copies of sensitive files or data derived from the sensitive files are also protected. Specific mechanisms for protecting the files include file hiding and file encryption.

When the mobile device is operating in one of the specified locations, the files can be located (e.g., they are not hidden). When the mobile device is operating in some other location, the files are hidden. One purpose of this mechanism is to prevent the user from accidentally revealing the contents of sensitive files while in locations where access to those files is not authorized.

One mechanism for hiding the files is to simply mark them "hidden" in their Windows properties pages, and to cache the access control list (ACL) on the file and then modify the permissions to deny all access by non-administrators. Other versions may use the file-system filter to more effectively render the files unavailable.

In one embodiment, files that are subject to location-based protection by the policy are always stored encrypted. When the mobile device is associated with one of the specified locations, the files can be decrypted. When the mobile device is associated with some other location, the files cannot be decrypted. This mechanism provides a benefit of preventing unauthorized persons who may have stolen the device from gaining access to sensitive files.

One mechanism for encrypting the files is to simply mark them "encrypted" in their properties pages, and to rely on the file hiding feature (see above) to stop the files from being decrypted in an unauthorized location. Other versions may use the file-system filter to more effectively encrypt the files in a way that does not depend on the operating system to prevent them from being decrypted in an unauthorized location.

Policies can have rules controlling the use of VPNs. For example, a rule can require that when the VPN is in use, all other ports are closed. This prevents hackers near the user from co-opting the user's device and coming in to the corporate network over the user's VPN connection. In one embodiment, a lightweight web-based VPN is used that allows traffic from selected applications (e.g., email) to be encrypted with Transport Layer Security (TLS).

In one embodiment, a VPN Lite 820 having a communication interface with the packet filter engine 818 establishes a TLS-encrypted, authenticated connection with the server, and then sends and receives traffic over this connection. The layer service provider 814 diverts the outgoing traffic from the application to a VPN client piece, and incoming traffic from the VPN client piece to the application.

In one implementation example in accordance with the present invention a layer is inserted into the Winsock environment, which opens up a Transport Layer Security (TLS) or Secure Socket Layer (SSL) socket to the VPN server, and tunnels all application network traffic through that connection to the VPN server. The applications are unaware that the VPN is active. The VPN has a very small footprint, since TLS is included in Windows.® In this example, using the Winsock Environment, all communication between client and server is routed through a secure channel. Unlike current clientless VPNs, all existing applications are supported As seen in the embodiment of FIG. 8, the packet filter engine 818 and the layer service provider 814 comprise implementation examples of functionality analogous to that of layer manager 206 in FIG. 2. The policy engine 832 performs implementation examples of functions of determining location analogous to those of the location detection module 208, of determining policies analogous to those of the policy setting module 212 and of identifying active security features analogous to those of the security features determination module 210. Furthermore, the packet filter engine 818, the TDI Filter 822, and the layer service provider 814 also perform implementation examples of enforcement mechanisms that the policy enforcement control module 214 may analogously perform.

For illustrative purposes only, the illustrated method embodiments illustrated in FIGS. 9A, 9B and 9C are discussed in the context of the system embodiment of FIG. 8.

FIG. 9A illustrates an example of a method 900 for determining whether the security feature of a connection type of wireless or wired is in effect for a communication session between the mobile device and another computer in accordance with an embodiment of the present invention. The policy engine 832 determines 902 whether a port is associated with a wired or wireless adapter based on one or more characteristics of the network adapter obtained from the operating system on the mobile device. For example, the management tools 816 of the operating system may retrieve these network characteristics from a look-up table in memory (e.g. a registry in a Windows® operating system) responsive to a query from the policy engine 832. The policy engine 832 associates the port with an adapter type value of wired or wireless in an adapter data object associated with each policy. In a similar manner, the policy engine 832 may also determine 906 from the operating system the class (e.g. 802.11b, 802.3, 802.11a, 802.11g) of the network adapters on the mobile device, and assign 908 a value to an adapter class field in the adapter data object associated with each policy. Furthermore, the policy engine 832 may determine 910 from the operating system the hardware brand of the network adapters on the mobile device, and assign 912 a value to an adapter brand field in the adapter data object associated with each policy.

FIG. 9B illustrates an example of a method 920 for determining whether the security feature of a security software program is currently executing on a mobile device for a communication session between the mobile device and another computer in accordance with an embodiment of the present invention. In one example, the policy engine 832 determines 922 from the operating system of the mobile device which security software programs (e.g. anti-virus, intrusion detection, VPN driver, 802.11i enhanced cryptography) are currently running on the mobile device. For example, the management tools or probes 816 operating in the operating system space may identify which security programs are running based on process tables the operating system maintains for each running software program responsive to a query from the policy engine 832. The policy engine 832 then assigns 924 a value in a field corresponding to the security software in a data object associated with each policy.

FIG. 9C illustrates an example of a method 930 for determining one or more security features of a network access point with which the mobile device is communicating in accordance with an embodiment of the present invention. In one example for determining the security features of the access point, network management software such as Simple Network Management Protocol (SNMP) is used to query the access point to obtain its operational characteristics.

It is determined 932 whether one or more security features of the network access point are operational in a communication session with the mobile device. For example, the policy engine 832 may determine whether the security feature of a security software program is currently executing on a network access point for a communication session in accordance with an embodiment of the present invention. In one instance, the policy engine 832 determines 932 from the operating system of the mobile device the security software associated with a network access point. One manner in which this may be done is that the management tools or probes 816 operating in the operating system space may identify processes executing on the mobile device in cooperation with security programs running on a wired or wireless network access point based on the process tables again responsive to a query from the policy engine 832. In another manner, the operating system management tools 816 may query the network access point regarding security software running in its LAN. The policy engine 832 assigns 934 a value in a field corresponding to the security feature such as the security software, in a data object associated with each policy.

Figure 10A:
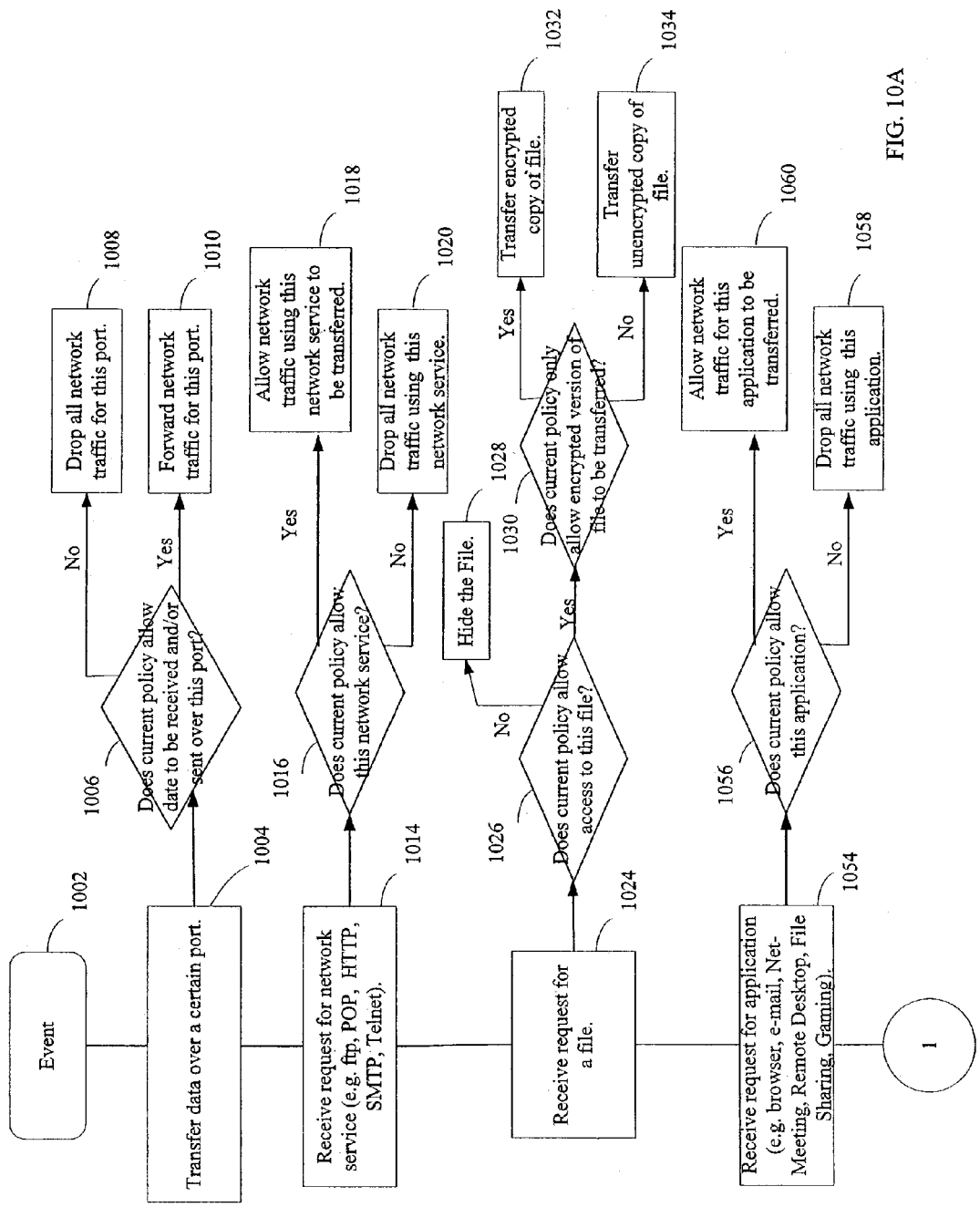
FIG. 10A illustrates a method of enforcing a security policy using illustrative examples of events in accordance with an embodiment of the present invention.
Figure 10:
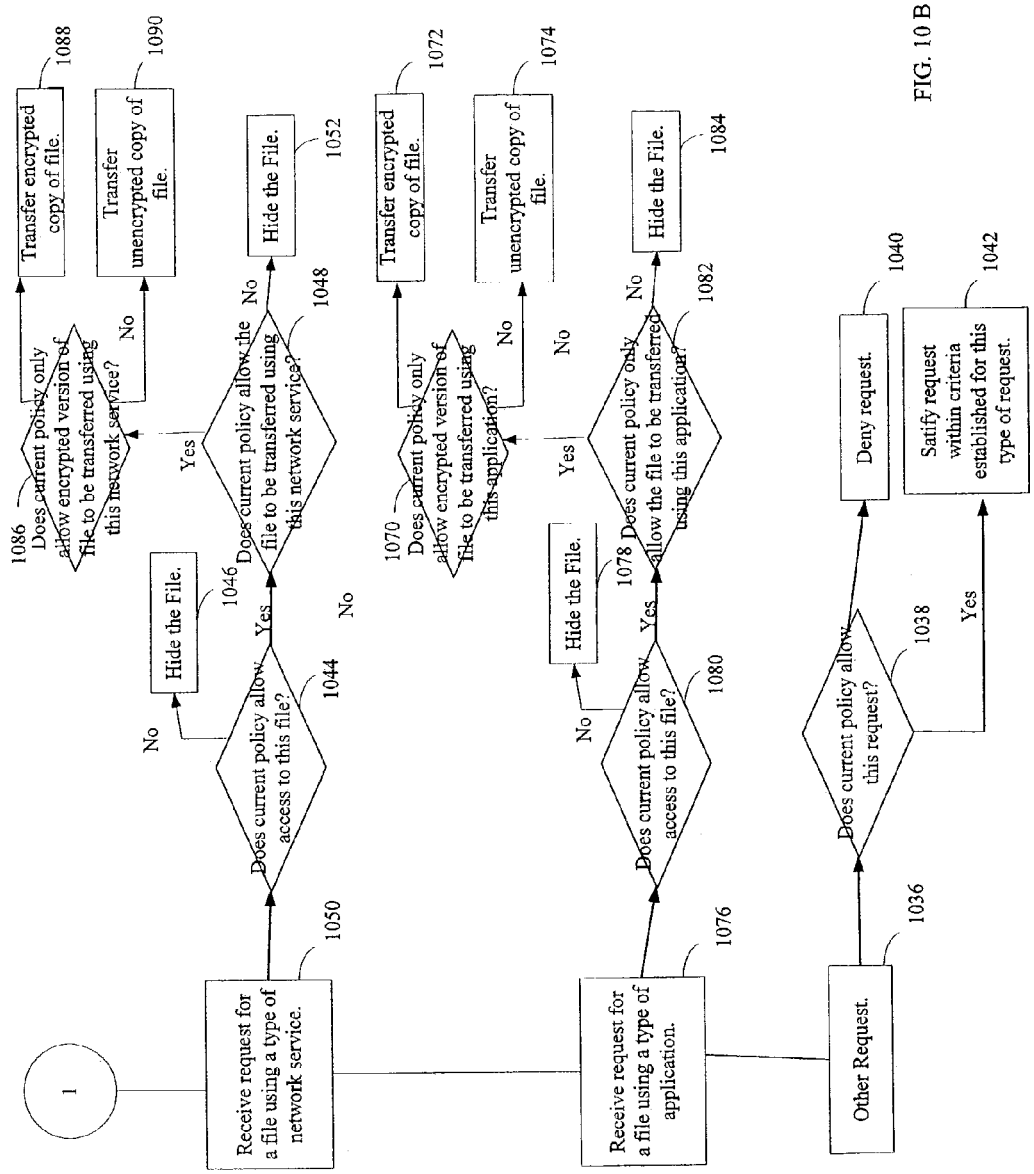
FIG. 10B continues the illustration of the method of enforcing a security policy using illustrative examples of events in accordance with the embodiment of the present invention in FIG. 10A.

FIGS. 10A and 10B illustrate a method of enforcing a security policy using illustrative examples of events in accordance with an embodiment of the present invention. For discussion purposes only, the illustrated method embodiment illustrated in FIGS. 10A and 10B is discussed in the context of the system embodiment of FIG. 8. In the event 1002 that data is to be transferred 1004 over a certain port, it is determined 1006 whether the current policy allows data to be received and/or sent over this port. Responsive to a determination that the current policy does not allow data transfer over this port, drop 1008 all network traffic, in this example embodied as packets, for this port. Responsive to a determination that the current policy does allow data transfer over this port, forward 1010 all network traffic, again in the form of packets in this example, for this port.

The type of network service being used may be monitored. An example of a type of network service is a service protocol for transferring data over a network. In the event 1002 that a request is received 1014 for processing data using a network service (e.g. File Transfer Protocol (FTP), Post Office Protocol (POP), Internet Mail Access Protocol (IMAP), Virtual Private Network (VPN), HTTP, HTTPS, SMTP, Telnet, etc.), the policy engine 832 determines 1016 whether the current policy allows this network service or a specific version of it, to execute. Responsive to a determination that the current policy, as defined in the embodiment of FIG. 8 above in the packet rules 810, allows this network service, the packet filter engine 818 allows network traffic embodied in packets using this network service to be transferred 1018. Responsive to a determination that the current policy, as defined in the embodiment of FIG. 8 above in the packet rules 810, does not allow or prohibits this network service, the packet filter engine 818 blocks 1020 all network traffic embodied in the example in packets for this network service.

In the event 1002 that a request is received 1024 for a file, the policy engine 832 determines 1026 whether the current policy allows access to this file. As defined in the embodiment of FIG. 8, the file rules 812 may define this aspect of the current policy. The file may be located in resident memory (see 220) or be accessible over a network (see 202). Responsive to a determination that the current policy allows access to this file, the policy engine 832 determines 1030 further whether only an encrypted version of the file is allowed to be accessed. Again, in FIG. 8, the file rules 812 may define this aspect of the current policy. Responsive to a determination that only an encrypted file is allowed to be transferred, the file filter 824 transfers 1032 an encrypted copy of the file. Responsive to a determination that encryption of the file is not required, the file filter 824 transfers 1034 an unencrypted copy of the file. Responsive to a determination that the current policy does not allow or prohibits access to this file, the policy engine 832 hides 1028 the file. The file may be hidden in various ways known to those of ordinary skill in the art. Examples include sending a notification that the file was not found instead of the file descriptor.

In the event 1002 that a request is received 1054 for processing data for an application (e.g. a browser, e-mail, NetMeeting, Remote Desktop, File Sharing or games), the policy engine 832 determines 1056 whether the current policy allows this application or a specific version of it, to execute. Responsive to a determination that the current policy, as defined in the embodiment of FIG. 8 above in the packet rules 810, allows this application, the packet filter engine 818 allows network traffic embodied in packets using this application to be transferred. Furthermore, the TDI filter 822 also monitors application parameters and allows the traffic associated with this application to be forwarded for further processing by the mobile device. Responsive to a determination that the current policy, as defined in the embodiment of FIG. 8 above in the packet rules 810, does not allow or prohibits this application, the packet filter engine 818 blocks 1058 all network traffic embodied in the example in packets for this application. Furthermore, in the embodiment of FIG. 8, the TDI filter 822 also monitors application parameters to block any network traffic at the upper layers for the prohibited application that may have bypassed the packet filter engine 818.

In the event 1002 of a request 1050 for a file using a first type of network service for transfer, it is determined 1044 whether the current policy allows access to this file. If no, hide 1046 the file. If yes, it is determined 1048 whether the file may be transferred using this first type of network service. If not, the policy engine 832 again hides 1046 the file. If access to the file is allowed for this first network service type, it is determined 1086 whether the current policy only allows an encrypted version of the file to be transferred using this first type of network service. If an encrypted version is required, transfer 1088 the encrypted copy or version. Otherwise, transfer 1090 an unencrypted copy of the file.

In the event 1002 of a request 1076 for a file using a first type of application for transfer, it is determined 1080 whether the current policy allows access to this file. If no, hide 1078 the file. If yes, it is determined 1082 whether the file may be transferred using this first type of application. If not, the policy engine 832 again hides 1078 the file. If access to the file is allowed for this first application type, it is determined 1070 whether the current policy only allows an encrypted version of the file to be transferred. If an encrypted version is required, transfer 1072 the encrypted copy or version. Otherwise, transfer 1074 an unencrypted copy of the file.

In the event 1002 of any other request 1036, the policy engine 832 performs the task of determining 1038 whether the current policy allows the request or prohibits it. Based on the outcome of this determination, the appropriate version of a policy enforcement module 214 such as the packet filter engine 818, the layer service provider 814, the file filter 824 either alone or in combination, enforce the policy by denying 1040 the request or satisfying 1042 the request with the criteria established by the current policy for this type of request.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system for providing protection of data accessible by a mobile device comprising:
    a location configuration module for pre-configuring a plurality of locations, each pre-configured location associated with a security policy, and at least one of the pre-configured locations being user-definable;
    a location detection module for detecting a location associated with a network environment in which the mobile device is operating;
    a location verification module for verifying that the detected location corresponds to one of the pre-configured locations, wherein the detected location is verified using a cryptographic authentication protocol between the mobile device and a server, wherein the server responds to a query from the mobile device to confirm that the detected location corresponds to one of the pre-configured locations;
    a policy setting module being communicatively coupled to the location detection module for communication of the detected location, the policy setting module determining a current security policy based upon a comparison of the detected location and at least one of the pre-configured locations, the current security policy determining accessibility of data for the mobile device; and
    a policy enforcement control module being communicatively coupled to the policy setting module for communication of the current security policy, the policy enforcement control module comprising one or more enforcement mechanism modules for enforcing the current security policy.

2. The system of claim 1 further comprising:
a layer manager being communicatively coupled to a network interface and being communicatively coupled to the location detection module, the layer manager communicating one or more parameters received from the network to the location detection module.

3. The system of claim 2 further comprising a user interface module for controlling one or more user interfaces for receiving input and displaying output, the policy setting module being communicatively coupled to the user interface module wherein the policy setting module defines an aspect of a security policy based on input received from the user interface module.

4. The system of claim 3 wherein the location detection module detects a location based on a plurality of parameters received from the network.

5. The system of claim 4 wherein at least two of the plurality of parameters is associated with a different layer in a model for communications between computers in a network.

6. The system of claim 4 wherein one of the parameters is an Internet Protocol address and another of the parameters is a port identifier.

7. The system of claim 4 wherein one of the parameters is an Internet Protocol address and another of the parameters is an application parameter.

8. The system of claim 3 further comprising:
a security features module for determining whether one or more security features have an activity status of inactive or active in a communication session between the mobile device and another computer; and
the policy setting module being communicatively coupled to the security features module for communication of the activity status of the one or more security features, the policy setting module determining the current security policy based upon the activity status of the one or more security features as well as the detected location.

9. The system of claim 2 wherein the location detection module detects a location based on a parameter received from the network.

10. The system of claim 9 wherein the parameter is a media access control address.

11. The system of claim 1 wherein the location detection module continuously detects the location in which the mobile device is operating;
responsive to a new location being detected, notifying the policy setting module of the new detected location;
responsive to the notification of the new detected location, the policy setting module determining whether the current security policy is to be changed to another policy; and
responsive to the change in policy being indicated, automatically making the other policy the current security policy; and
responsive to the other policy being made the current security policy, the policy enforcement module automatically enforcing the other policy as the current policy.

12. The system of claim 1 wherein the location detection module comprises instructions for determining whether a first subset including M parameters of a set of N parameters received from the network indicates a location in accordance with a predetermined matching criteria.

13. The system of claim 12 wherein the location detection module comprises instructions for assigning weighted values to each parameter in a set, calculating a number using the weighted values, responsive to the calculated number satisfying a predetermined threshold for a location, assigning that location as the detected location.

14. The system of claim 12 wherein the M parameters includes one from the group of:
a domain identifier;
a gateway server identifier;
a domain name system server Internet Protocol address; and
a dynamic host control protocol server Internet Protocol address.

15. The system of claim 1 wherein the location detection module includes instructions for detecting location using a second cryptographic authentication protocol between the mobile device and the server.

16. The system of claim 1 further comprising:
a security features module for determining whether one or more security features have an activity status of inactive or active in a communication session between the mobile device and another computer; and
the policy setting module being communicatively coupled to the security features module for communication of the activity status of the one or more security features, the policy setting module determining the current security policy based upon the activity status of the one or more security features as well as the detected location.

17. The system of claim 16 wherein at least one of the security features is a connection type of wired or wireless.

18. The system of claim 16 wherein at least one of the security features is a security software program.

19. The system of claim 1 wherein the policy enforcement control module prevents the mobile device from transferring data using one or more applications not permitted by the current security policy.

20. The system of claim 1 wherein the policy enforcement control module executes rules of the current security policy requiring that files being transferred using one or more applications be encrypted.

21. The system of claim 1 wherein the policy enforcement control module prevents the mobile device from transferring a file using a particular application in accordance with the current security policy.

22. The system of claim 1 wherein the one or more enforcement mechanism modules for enforcing the current security policy comprises an adaptive port blocking module for filtering network traffic on one or more designated ports in accordance with the current security policy.

23. The system of claim 22 wherein the adaptive port blocking module performs the following in accordance with a first security policy:
allowing inbound network traffic to the mobile device, the inbound network traffic being responsive to one or more previously sent requests in outbound network traffic transmitted from the device; and
blocking the inbound network traffic that is not responsive to the one or more previously sent requests in the outbound network traffic.

24. The system of claim 22 wherein the adaptive port blocking module performs the following in accordance with a first security policy:
blocking all inbound network traffic to the mobile device and all outbound network traffic from the mobile device.

25. The system of claim 22 wherein the adaptive port blocking module performs the following for a user-defined port group in accordance with a first security policy:
allowing inbound network traffic to the mobile device, the inbound network traffic being responsive to one or more previously sent requests in outbound network traffic transmitted from the device; and blocking the inbound network traffic that is not responsive to the one or more previously sent requests in the outbound network traffic.

26. The system of claim 1 wherein the one or more enforcement mechanism modules comprises a file filter module for controlling access to a file in accordance with a first security policy.

27. The system of claim 26 wherein the first security policy comprises a rule that is enforced by the file filter module of:
allowing access only to an encrypted version of the file.

28. The system of claim 26 wherein the first security policy comprises a rule that is enforced by the file filter module of:
hiding the file.

29. The system of claim 26 wherein the first security policy comprises the following rules that are enforced by the file filter module:
responsive to a request of a first application type for the file, hiding the file; and
responsive to another request from a second application type for the file, allowing access to the file.

30. The system of claim 26 wherein the first security policy comprises the following rules that are enforced by the file filter module:
responsive to a request of a first application type for the file, allowing access only to an encrypted version of the file; and
responsive to another request from a second application type for the file, allowing access to an unencrypted version of the file.

31. The system of claim 1 wherein the location detection module detects the location based upon at least one from the group of:
a type of application;
a type of protocol;
a type of connection;
an IP address;
a MAC address;
routing information;
a security software program;
whether a virtual private network is running; or
whether one or more security features have an activity status of inactive or active in a communication session between the mobile device and another computer.

32. The system of claim 31 wherein the type of connection is one from the group of:
a wired connection;
a wireless connection;
an ethernet connection; or
a digital subscriber line.

33. A method for providing protection of data accessible by a mobile device comprising:
pre-configuring a plurality of locations, each pre-configured location associated with a security policy, and at least one of the pre-configured locations being user-definable; detecting a location associated with a network environment in which the mobile device is operating;
verifying that the detected location corresponds to one of the pre-configured locations, wherein the detected location is verified using a cryptographic authentication protocol between the mobile device and a server, wherein the server responds to a query from the mobile device to confirm that the detected location corresponds to one of the pre-configured locations;
determining a current security policy based upon a comparison of the detected location and at least one of the pre-configured locations, the current security policy determining accessibility of data for the mobile device; and
enforcing the current security policy.

34. The method of claim 33 further comprising:
determining whether one or more security features have an activity status of inactive or active in a communication session between the mobile device and another computer; and
determining the current security policy based upon the activity status of the one or more security features as well as the detected location.

35. The method of claim 33 wherein the detecting the location in which the mobile device is operating includes detecting the location on a continuous basis;
wherein determining the current security policy based upon the detected location includes changing the current security policy automatically responsive to a notification of a newly detected location that is associated with another policy; and
wherein enforcing the current security policy includes automatically enforcing the other policy as the current policy.

36. The method of claim 33 wherein detecting the location in which the mobile device is operating is based on a parameter received from the network.

37. The method of claim 36 wherein the parameter is a media access control address.

38. The method of claim 33 wherein detecting the location in which the mobile device is operating is based on a plurality of parameters received from the network.

39. The method of claim 38 wherein at least two of the plurality of parameters is associated with a different layer in a model for communications between computers in a network.

40. The method of claim 38 wherein one of the parameters is an Internet Protocol address and another of the parameters is a port identifier.

41. The method of claim 38 wherein one of the parameters is an Internet Protocol address and another of the parameters is an application parameter.

42. The method of claim 33 wherein detecting the location in which the mobile device is operating comprises determining whether a first subset including M parameters of a set of N parameters received from the network indicates a location in accordance with a pre-determined matching criteria.

43. The method of claim 42 wherein the M parameters includes one from the group of:
a domain name system server Internet Protocol address;
a dynamic host control protocol server Internet Protocol address;
a domain identifier; and
a gateway server identifier.

44. The method of claim 33 wherein detecting the location in which the mobile device is operating comprises assigning weight values to each of N parameters, calculating a number using the weight values, responsive to the calculated number satisfying a predetermined number for a location, assigning that location as the detected location.

45. The method of claim 44 wherein the calculated number is one from the group of a sum and an average.

46. The method of claim 33 wherein detecting the location in which the mobile device is operating is using a second cryptographic authentication protocol between the mobile device and the server.

47. The method of claim 33 wherein detecting the location in which the mobile device is operating comprises:

determining whether a first subset including M parameters of a set of N parameters received from the network indicates a location in accordance with a predetermined matching criteria.

48. The method of claim 33 wherein detecting the location in which the mobile device is operating comprises:
assigning weighted values to each parameter in a set;
calculating a number using the weighted values; and
responsive to the calculated number satisfying a predetermined threshold for a location, assigning that location as the detected location.

49. The method of claim 33 wherein enforcing the current security policy comprises:
responsive to a request for a file using a first application type for transfer, hiding the file.

50. The method of claim 49 wherein enforcing the current security policy further comprises:
responsive to another request from a second application type for the file, allowing access to the file.

51. The method of claim 33 wherein enforcing the current security policy comprises:
responsive to a request of a first application type for a file, allowing access only to an encrypted version of the file.

52. The method of claim 51 wherein enforcing the current security policy further comprises:
responsive to another request from a second application type for the file, allowing access to an unencrypted version of the file.

53. The method of claim 33 wherein enforcing the current security policy comprises preventing the mobile device from transferring data using one or more applications not permitted by the current security policy.

54. The method of claim 33 wherein enforcing the current security policy comprises:
performing adaptive port blocking filtering of network traffic on one or more designated ports in accordance with the current security policy.

55. The method of claim 54 wherein adaptive port blocking filtering includes performing the following in accordance with a first security policy:
allowing inbound network traffic to the mobile device, the inbound network traffic being responsive to one or more previously sent requests in outbound network traffic transmitted from the device; and
blocking inbound network traffic that is not responsive to the one or more previously sent requests in outbound network traffic.

56. The method of claim 54 wherein adaptive port blocking filtering includes performing the following in accordance with a second security policy:
blocking all inbound network traffic to the mobile device and all outbound network traffic from the mobile device.

57. The method of claim 54 wherein adaptive port blocking filtering includes performing the following for a user-defined port group in accordance with a first security policy:
allowing inbound network traffic to the mobile device, the inbound network traffic being responsive to one or more previously sent requests in outbound network traffic transmitted from the device; and
blocking inbound network traffic that is not responsive to the one or more previously sent requests in outbound network traffic.

58. The method of claim 33 wherein enforcing the current security policy includes controlling access to a file in accordance with a first security policy.

59. The method of claim 58 wherein controlling access to the file in accordance with the first security policy comprises:
responsive to encryption of the file being required for file transfer by the first security policy, allowing access only to an encrypted version of the file.

60. The method of claim 58 wherein controlling access to the file in accordance with the first security policy comprises:
responsive to transfer of the file being prohibited by the first security policy, hiding the file.

61. The method of claim 33 wherein detecting the location is based upon at least one from the group of:
a type of application;
a type of protocol;
a type of connection;
an IP address;
a MAC address;
routing information;
a security software program;
whether a virtual private network is running; or
whether one or more security features have an activity status of inactive or active in a communication session between the mobile device and another computer.

62. The method of claim 61 wherein the type of connection is one from the group of:
a wired connection;
a wireless connection;
an ethernet connection; or
a digital subscriber line.

63. A system for providing protection of data accessible by a mobile device comprising:
means for pre-configuring a plurality of locations, each pre-configured location associated with a security policy, and at least one of the pre-configured locations being user-definable;
means for detecting a location associated with a network environment in which the mobile device is operating;
means for verifying that the detected location corresponds to one of the pre-configured locations, wherein the detected location is verified using a cryptographic authentication protocol between the mobile device and a sewer, wherein the sewer responds to a query from the mobile device to confirm that the detected location corresponds to one of the pre-configured locations;
means for determining a current security policy based upon a comparison of the detected location and at least one of the pre-configured locations, the current security policy determining accessibility of data for the mobile device; and
means for enforcing the current security policy.

64. The system of claim 63 further comprising:
means for determining whether one or more security features have an activity status of inactive or active in a communication session between the mobile device and another computer; and
means for determining the current security policy based upon the activity status of the one or more security features as well as the detected location.

65. A computer-usable medium comprising instructions for causing a computing device to execute a method for providing protection of data accessible by a mobile device, the medium further comprising:

means for pre-configuring a plurality of locations, each pre-configured location associated with a security policy, and at least one of the pre-configured locations being user-definable;

means for detecting a location associated with a network environment in which the mobile device is operating;

means for verifying that the detected location corresponds to one of the pre-configured locations, wherein the detected location is verified using a cryptographic authentication protocol between the mobile device and a server, wherein the server responds to a query from the mobile device to confirm that the detected location corresponds to one of the pre-configured locations;

means for determining a current security policy based upon a comparison of the detected location and at least one of the pre-configured locations, the current security policy determining accessibility of data for the mobile device; and means for enforcing the current security policy.

66. The computer-usable medium of claim 65, further comprising:

means for determining whether one or more security features have an activity status of inactive or active in a communication session between the mobile device and another computer; and means for determining the current security policy based upon the activity status of the one or more security features as well as the detected location.

\* \* \* \* \*